(12) United States Patent
Kantal et al.

(10) Patent No.: US 12,556,465 B2
(45) Date of Patent: Feb. 17, 2026

(54) PLATFORM FOR AUTOMATED MANAGEMENT OF SERVERS

(71) Applicant: Citigroup Technology, Inc., New York, NY (US)

(72) Inventors: Ashim Kantal, Irving, TX (US); Sunny Behl, Irving, TX (US); Suresh Kanyaka Billa, Frisco, TX (US); Sandeep Ravi, Coppell, TX (US)

(73) Assignee: CITIGROUP TECHNOLOGY, INC., New York, NY (US)

( * ) Notice: Subject to any disclaimer, the term of this patent is extended or adjusted under 35 U.S.C. 154(b) by 38 days.

(21) Appl. No.: 18/587,290

(22) Filed: Feb. 26, 2024

(65) Prior Publication Data

US 2024/0250885 A1    Jul. 25, 2024

Related U.S. Application Data

(63) Continuation-in-part of application No. 18/394,929, filed on Dec. 22, 2023, now Pat. No. 12,294,509.
(Continued)

(51) Int. Cl.
*H04L 41/50* (2022.01)
*G06F 11/32* (2006.01)
*G06F 11/34* (2006.01)

(52) U.S. Cl.
CPC ........ *H04L 41/5096* (2013.01); *G06F 11/323* (2013.01); *G06F 11/3409* (2013.01)

(58) Field of Classification Search
CPC . H04L 41/5096; G06F 11/323; G06F 11/3409
(Continued)

(56) References Cited

U.S. PATENT DOCUMENTS 10,331,429 B2    6/2019    Pfleger De Aguiar et al.
11,733,996 B2    8/2023    Parthasarathy et al.
(Continued)

FOREIGN PATENT DOCUMENTS

JP    2005-216314 A    8/2005
KR    100457825 B1    11/2004
(Continued)

OTHER PUBLICATIONS

International Search Report and Written Opinion on PCT App. PCT PCT/US2024/012007 dated Mar. 7, 2024 (9 pages).
(Continued)

*Primary Examiner* — Glenford J Madamba
(74) *Attorney, Agent, or Firm* — Foley & Lardner LLP

(57) ABSTRACT

Presented herein are systems and methods for managing networked environments. A computer system may maintain a plurality of process flows to manage a plurality of services in a network. Each respective process flow of the plurality of process flows may identify: (i) a respective trigger to invoke the respective process flow to initiate a first process of a plurality of processes on at least one of the plurality of services. The computing system may select, responsive to detecting a trigger, a process flow from the plurality of process flows based on the trigger. The computing system may execute, in accordance with the process flow, at least one process of the plurality of processes on at least one of the plurality of services in the network.

20 Claims, 31 Drawing Sheets

Related U.S. Application Data which is a continuation of application No. 18/215,598, filed on Jun. 28, 2023, now Pat. No. 11,863,308, which is a continuation of application No. 18/099,826, filed on Jan. 20, 2023, now Pat. No. 11,695,655.

(58) Field of Classification Search
USPC ........................................................ 709/224
See application file for complete search history.

(56) References Cited

U.S. PATENT DOCUMENTS

| | | | | |
|---|---|---|---|---|
| 11,863,308 B1* | 1/2024 | Behl | ............... | G06F 11/323 |
| 2009/0319783 A1* | 12/2009 | Thornton | ............... | H04L 9/3271 |
| | | | | 713/156 |
| 2011/0138374 A1 | 6/2011 | Pal | | |
| 2015/0261624 A1* | 9/2015 | Locasto | ............... | G06F 11/1471 |
| | | | | 714/19 |
| 2018/0131574 A1 | 5/2018 | Jacobs et al. | | |
| 2020/0142689 A1 | 5/2020 | Fahland et al. | | |
| 2023/0236880 A1* | 7/2023 | Eliyahu | ............... | G06F 9/4881 |
| | | | | 718/102 |
| 2024/0250885 A1 | 7/2024 | Kantal et al. | | |

FOREIGN PATENT DOCUMENTS

| | | |
|---|---|---|
| KR | 100586486 B1 | 6/2006 |
| WO | WO-2016/049376 A1 | 3/2016 |

OTHER PUBLICATIONS

PCT International Search Report and Written Opinion for Application No. PCT/US2025/016982 mailing date Apr. 24, 2025, 28 pages.

* cited by examiner

Automated Management of Production

Home  LOB Dashboards  Services  Tools  Contact Manager  About Us          Search AMP functions 🔍

| Patch Dashboard Module | Execution Module | Patch Scheduling Module | Validation Module |

👤 John Doe

Search by CSI  | Search by Patch Window

NA ▼   166958-DIGITAL CRS FUSION CONSUMER SERVICING ✕    Production ▼    [Search]

— 400
— 404
— 406
— 408
— 410
— 412
— 402

| ☐ | CSL ↑ | HOSTNAME ↑ | PRODUCTS ↑ | DATA CENTER NAME ↑ | OS & CURRENT PA..↑ | LOWER ENV VALID..↑ | PATCH STATUS ↑ | SPLUNK LINK ↑ |
|---|---|---|---|---|---|---|---|---|
| ☐ | 166958 | CRSAP-PRD1900 | UNKNOWN, WebSphere ND, ... | SWDC | 7-2022h | 👍 | Completed-unified_rheLself_service_patch@11/1... | Check splunk log |
| ☐ | 166958 | CRSAP-PRD1901 | UNKNOWN, WebSphere ND, ... | SWDC | 7-2022h | 👍 | PlaybookReady-unified_rheLself_service_patch@11/1... | Check splunk log |
| ☐ | 166958 | CRSAP-PRD1902 | WebSphere, ND, Wily, Wily-EP | SWDC | 7-2022h | 👍 | Completed-unified_rheLself_service_patch@11/1... | Check splunk log |
| ☐ | 166958 | CRSAP-PRD1903 | Nginx, WebSphere ND, Wily, Wily-EP | SWDC | 7-2022h | 👍 | Completed-unified_rheLself_service_patch@11/1... | Check splunk log |
| ☐ | 166958 | CRSAP-PRD1904 | Nginx, WebSphere ND, Wily, Wily-EP | SWDC | 7-2022h | 👍 | In-Progress-unified_rheLself_service_patch@11/1... | Check splunk log |
| ☐ | 166958 | CRSAP-PRD1905 | Nginx, WebSphere ND, Wily, Wily-EP | SWDC | 7-2022h | 👍 | In-Progress-unified_rheLself_service_patch@11/1... | Check splunk log |

FIG. 4

SRE Selfservice

Select LOB *
Digital ▽

Select Application *
Mobile iOS ▽

[ Onboard New Business Transactions 🔒 ]

| # | Name | Status | | |
|---|------|--------|---|---|
| 1. | Wealth Account Opening 🔒 | Active ⊙ | / | 🔲 > |
| 2. | Payment 🔒 | Active ⊙ | / | 🔲 > |
| 3. | Navigation 🔒 | Active ⊙ | / | 🔲 > |
| 4. | Dashboard 🔒 | Active ⊙ | / | 🔲 > |
| 5. | MCD 🔒 | Active ⊙ | / | 🔲 > |
| 6. | Statement 🔒 | Active ⊙ | / | 🔲 > |
| 7. | Password Login 🔒 | Active ⊙ | / | 🔲 > |
| 8. | Bio Authorization 🔒 | Active ⊙ | / | 🔲 > |
| 9. | Wealth Account Details 🔒 | Active ⊙ | / | 🔲 > |

| Select LOB | Select Application | Select Business Transactions | Select Time Frame | | |
|---|---|---|---|---|---|
| Digital ▽ | Mobile iOS ▽ | Bio Authorization ▽ | Weekly ▽ | 🔍Get Report ⟲Reset | ⬇Download |

| Dates | Volume | | Failures | Latency | | Availability (%) |
|---|---|---|---|---|---|---|
| | Total Request Per Day | Peak TPS | Failures (%) | Average Response Time (ms) | % Slowcalls >3.5 sec, 5% | |
| Bio Authorization SLO | 3200000 | 60.00 | 5.00 | 2,900.00 | | |
| 2022-12-14 | 2757722 | 47.98 | 0.62 | 2864.37 | 15.48 | 99.00 |
| 2022-12-13 | 2688083 | 47.81 | 0.65 | 2853.32 | 13.76 | 100.00 |
| 2022-12-12 | 2564341 | 46.76 | 0.63 | 2857.48 | 14.45 | 100.00 |
| 2022-12-11 | 2029623 | 36.75 | 1.99 | 2818.39 | 12.76 | 96.53 |
| 2022-12-10 | 2361761 | 43.56 | 0.65 | 2830.76 | 13.50 | 100.00 |
| 2022-12-09 | 2985485 | 54.38 | 0.63 | 2862.91 | 16.04 | 100.00 |
| 2022-12-08 | 2751367 | 47.91 | 0.65 | 2997.09 | 13.63 | 100.00 |
| 2022-12-07 | 2806292 | 48.44 | 0.71 | 3112.84 | 13.81 | 100.00 |

Automated Management of Production &John Doe

Search AMP functions Q

Welcome to AMP Intelligent L1

Intelligent L1 is an Artificial Intelligence Tool, which uses inbuilt NLP framework to provide self service incident resolution options to eservice.

Affected Agent SOEID* (sb60168)

Could you please select impacted Application name?

[Sawgrass x ▽]

Note: If application is not in the drop down please reach out to the helpdesk

Below is the health check status of the critical features

| Features | Health Status |
|---|---|
| Login | OK |
| Add Payment | OK |
| Auto Pay | OK |
| Customer Issuance Update | OK |
| Card Activation | OK |

∨ Previous name per page [5 ▽]  1 – 5 of 7 < >

Do you want to create an incident for this issue? [YES] [NO]
Do you want to update the Journal of an Incident? [YES] [NO]

Issue category
(latency issue)(not working)(not loading)(freezing)
(Payment issue)(blank screen)(Auto Pay)(autologout)
(Contact Information Update issue)(Income Update issue)
(Card Activation issue)(unable to view customer details)
(Others)

Workflow Execution

[ Execution ] [ Scheduled ]  Search Execution 🔍  ⟳ Execute Workflow  [ Schedule ▼ ]

— 2505

---

Execution ID: 172087_GTDCtoSWDC_failover_02  ● Success  Duration: 10 mins ⋮

Workflow ID172087_AMP_GTDCtoSWDC_failover_1 | CSIID : 172087
Version : V1 | Environment :PROD
Sector : PBWM | Start Date : 10/29/2023 02:18:07
Sub Sector :PB | End Date : 10/29/2023 02:40:07
Region : NAM | Triggered By SD38717  ⟳ Re-run  ⏸ Paused

---

Execution ID: 172087_GTDCtoSWDC_failover_01  ● Success  Duration: 10 mins ⋮

Workflow ID 172087_AMP_GTDCtoSWDC_failover_02 | CSIID : 172087
Version : V1 | Environment :PROD
Sector : PBWM | Start Date : 2023-11-02 10:36:36
Sub Sector :PB | End Date : 2023-11-02 10:36:36
Region : NAM | Triggered By  ⟳ Re-run  ⏸ Paused

FIG. 25B

PLATFORM FOR AUTOMATED MANAGEMENT OF SERVERS

CROSS REFERENCES TO RELATED APPLICATIONS

The present application claims priority under 35 U.S.C. § 120 as a continuation-in-part of U.S. patent application Ser. No. 18/394,929, titled "Platform Automated Management of Servers," filed Dec. 22, 2023, which claims priority under 35 U.S.C. § 120 as a continuation of U.S. patent application Ser. No. 18/215,598, titled "Platform Automated Management of Servers," filed Jun. 28, 2023, now U.S. Pat. No. 11,863,308, which claims priority under 35 U.S.C. § 120 as a continuation of U.S. patent application Ser. No. 18/099,826, titled "Platform for Automated Management of Servers," filed Jan. 20, 2023, now U.S. Pat. No. 11,695,655 each of which are incorporated by reference in their entirety.

TECHNICAL FIELD

This application generally relates to managing servers in networked environments. In particular, the present application relates to a graphical user interface for managing server groups in networked environments.

BACKGROUND

Servers physically residing across various sites may host and provide resources for an application (e.g., a web application) over a computer networked environment. The application may have a plethora of functionality to be accessed by end-user devices. In doing so, the application may produce an immense amount of complex data related to the various operations of the application, such as network metrics, application performance, and server. Due to the enormous quantity of data, it may be difficult for a network administrator to manage the server's hosted resources for the application as well as the application itself. Furthermore, the network administrator may have to access one tool to obtain one set of data and another tool to retrieve another set of data to make any decisions regarding the system. Due to the inability to manage the network, any problems affecting the performance of the application or the servers hosting the application may remain unresolved and continue to linger.

SUMMARY

Disclosed herein are systems and methods for managing networked environments. Servers residing at different sites and hosting resources for an application (or a service) may collect an immense amount of data associated with the application. The data may include, for example, the network traffic from the server to the end-user devices, invocations of various functions of the application, and information about the end-user devices accessing the application, among others. The amount of data collected by the servers may become enormous and complex, when aggregated over multiple servers, applications, and end-user devices over the networked environment.

A network administrator of the environment may use the data to diagnose any problems within the servers or the application and carry out any measures in an attempt to address the issues or sub-optimal conditions. The administrator may rely on a multiplicity of tools (e.g., applications or services) to view pieces of the data to assess the environment and to undertake any actions based on such assessments. For example, to update a version of the application hosted on a given group of servers, the administrator may access the individual servers to find which version of the application is installed thereon. Upon finding the version, the administrator may have to run a shutdown process for the individual servers and open a tool to roll out and install the update to the application. Once the installation is complete, the administrator may have to run yet another tool to perform validation check of the update. Other aspects of managing the environment may similarly rely on multiple tools, such as for failover management, predictive analytics, reliability checks, and incident ticketing, among others.

With more and more tools for various, specific aspects of the networked environment, it may be overly cumbersome for the network administrator to effectuate effective administration and management of the servers in the networked environment. The inability to quickly access and digest data relevant to management of the network may leave problems and other sub-optimal conditions in the environment unaddressed. This may result in wasted consumption of computing resources at each server, reduced capabilities of the applications hosted thereon, and degradation of network conditions, such as lower available bandwidth and increased latency. The culmination of these sub-optimal conditions may lead to the deterioration of the overall performance of the environment and a decrease in the quality of human-computer interaction (HCI) between the end-users and the applications hosted on the servers.

To address these and other technical challenges, an automated management service may provide a user interface (also referred herein as a dashboard) to integrate various aspects of network administration. The user interface may provide a set of options to retrieve performance data of applications and servers in the environment as well as to carry out various actions to manage the applications and servers in the network. The options provided by the user interface may include, for example, a one-touch patch management, a one-touch continuity of traffic fail over, predictive analytics, site reliability, and a services assistant, among others.

The one-touch patch management may provide for automated process of patch installation for an application hosted on servers with a single interaction with a user interface element of the dashboard. This feature may eliminate manual steps and system administration resources doing repeatable work from patch scheduling phase to patch execution via orchestration. The patch management may automate shutting down of servers before triggering patch and restoring same set of servers after patching, and may provide for the ability to reboot servers and perform post patching checks including validation, without any manual intervention.

The one-touch continuity traffic failover may provide self-service mechanisms to failover application traffic between groups of servers at different sites (e.g., data centers), during maintenance windows and during major incidents. This may mitigate the impacts of any interruption in server to end-users and may allow quick transfer of traffic from one site to another site until restoration of the original group of servers. The failover feature may enable integration with server infrastructure to automate datacenter failover and may provide for live application traffic trends across sites.

The predictive analytics interface may provide for observability of applications and associated functionality (sometimes herein referred to as transactions) by displaying real-time performance of services. Machine learning models may be used to quickly process accumulated data to produce a performance indicator for each function of a given application hosted on a server. This solution may involve automation leveraging historical application health metrics and anomaly detection techniques comparing dynamic baselines with observed values. The analytics interface may also provide a drill down of historical trends of various related metrics, such as volumes, slow calls, and success or error rates, among others.

In addition, the user interface may provide for a site reliability interface. This feature allows the user to define a service level indicator (SLI) across various specifications, such as availability, latency, quality, coverage, and durability, among others. The automated management service may record success and failure counts for each function (or transaction type or feature) provided by the application. The service may calculate availability and error based on a defined service level objection (SLO). This site reliability interface may also provide ability to select different onboarded applications along with types of functions to present reliability metrics in a selected timeframe. For each type of function, the site reliability interface may provide real-time incremental SLO and error rates indicating upwards or downwards trend. The feature may provide comprehensive view of all types of functions, with rates of failure, availability, and error budgets, among others.

The user interface may also provide an intelligent customer services assistant. The self-service feature may include a services agent to perform application health checks and provide information from a knowledge base around frequently reported issues. The agent may also provide for a ticketing service to raise incidents and contacting service agents to allow for a seamless experience in opening tickets and post initial validations. This feature may also prevent duplicate incidents to be raised by multiple agents for the same issue, and may enable incidents to be opened with appropriate quality with minimal information auto filled via questionnaire interface.

In this manner, the management service may provide for automation of tactical activities with strategic oversight, instead of manually spending time and skilled expertise on issues within the network. The dashboard user interface may thus augment resource capabilities, allowing the network administrator to focus on issues. The automated management service may provide for reduction of operating maintenance by improving efficiency and significantly reducing the manual and tactical resource intensive efforts with automated workflows.

The service may improve mean time to recovery (MTTR) by eliminating hosting batches and team involvement in tedious issues when log analysis and re-runs may be used to address such issues. The service may reduce noise alerts by filtering alerts and suppressing false positives. Furthermore, the automated management service may provide for process simplification and workflow automation by improving visibility to various processes, indication of service level agreement (SLA) objectives, and certificate and risk management. The improvement may involve reduced risk in missing SLA objectives with heat maps and a forecast of potential SLA deviations.

The service may also allow prediction, prescription, and prevention of outages using combination of artificial intelligence (AI) and automation, thereby ensuring predictable and silent operations. The service may minimize impacts due to change in implementations through environment analysis, automated severity assessments, self-diagnosis, and automated health check and validations, among others.

The service may provide for proactive optimizations through one-touch failover, identification of repetitive issues, and anomaly detection, thereby providing an opportunity to pinpoint root causes and proactively prescribe countermeasures. The service may construct end-to-end mapping of impact to function types, measuring latency, slow calls, availability, and errors, among others. The automated management service may transform operations to support autonomous operations by eliminating tickets through the services agent and knowledge database.

Furthermore, an automated management service may provide a user interface (also referred herein as a dashboard or an onboarding screen) with which a network administrator can create and modify a process flow (also referred herein as a work-flow). For example, the administrator can interact (e.g., drag and drop) with user interface elements on the user interface to define the process flow. Within the user interface, each node can an individual operation or process within the flow, such as a service or server restart, traffic failover, and configuration update, among others. Each of the nodes can accept user input to define parameters for the process, and be represented by a visualized object (e.g., an icon or label). The nodes can be connected to one another with edges within the user interface. Each edge can represent a relationship or a conditional logic between the operation or process in the process flow. For instance, an edge can define execution of one process at one service, upon completion of another process at another service. In addition, the user interface may be used to define a schedule (e.g., at a specific time or interval) or a trigger (e.g., an occurrence of an event) for the process flow.

Through the user interface for determining process flows, the automated management service may provide a wide range of integration and extensibility. For example, the automated management service may provide for an application programming interface (API) integration with external services (e.g., via one or more of the nodes) to carry out certain tasks. The user interface may allow users to define custom actions or scripts that can be triggered as part of the process flow. In addition, the user interface may accept input from the network administrator defining error handling logic (e.g., retry or fallback options). The automated management service may for collaborative editing with multiple users managing the process flow.

The automated management service may provide for reliability and robustness via the definition of the process flow. For instance, the automated management service can provide for version control by allowing the user to define a version for each iteration of the process flow. Each version may identify an editor of the process flow and a time stamp at which the modification to the process flow was made to be used for auditing. The user interface may allow for role-based access control to limit creation, modification, or execution of the process flow. In addition, for certain modification or changes, some users may be notified that approval is to be requested from other users with access privileges. Furthermore, the automated management service may provide tools to define the nodes and edges of the process flow. For example, the automated management service may provide users with template process flows for commonly used tasks. In addition, the service may have a library of documentations on each type of node as well as error codes. The service may store and maintain definitions for the process flows in a secure environment to prevent malicious modification of the processes.

The definition of the nodes and edges through the user interface may be used by the automated management service to create various process flows, such as a failover process flow, an anomaly handling process flow, and a certificate renewal process flow, among others. The failover process flow may be used to restore access to a service when one server group (e.g., in a data center) hosting the service suffers a failure. The failover process flow may include processes to check health of services in other server groups (e.g., other data centers) and select the appropriate server group to which to transfer the network traffic. The failure process flow may be automatically executed without any manual execution (e.g., interaction with the user interface).

Continuing on, the anomaly handling process flow may include various process such as checking a health of services, performing a restart action on the affected services, and then a validation check of the services after restart to resolve the anomaly event. The detection anomaly event can be used as a trigger for executing the anomaly handling process flow. The certificate renewal process flow may be used to renew a certificate upon detection of expiration of the initially issued certificate. The certificate renewal process flow may include submitting a request to an issuance service, identifying affected services (e.g., corresponding to services with certificates expiring within a certain timeframe), receiving the new certificate, and validating the completion of the renewal process.

With a configuration of the process flow, the automated management service may monitor for triggers in the network environment. Upon detection of a trigger for a process flow, the service can initiate execution of the process flow in accordance with its definitions. The trigger may include, for example, a manual execution to allow the user to trigger the process flow or an automated execution to initiate a process flow in response to an occurrence of an event. When there are multiple triggers at least in partial concurrence, the service may execute multiple process flows in parallel. In addition, the service may allocate and distribute computing resources in execution of the process flows. The service can securely store data outputted from the execution of the processes.

In conjunction, the service may provide another user interface (also referred herein as an administration screen) to manage process flows for a set of services. The service may also provide another user interface (also referred herein as an audit trail screen) to monitor for execution status of process flows with time stamps and other details. The user interface may provide notifications (e.g., in the form of electronic mail or a pop-up window) to indicate a status of the process flow. As the process flow executes, the user interface may present a progress of the process flow in real-time with a visual indicator for each process.

In this manner, the automated management service may provide user interfaces for managing and executing a structured sequence of processes in accordance with a definition of the process flow. These sequence of processes may be defined to executed upon a schedule or in response to a trigger, thereby reducing or eliminating manual involvement in the administration of services in the networked environment. The user interface may automate and streamline complex processes for enhancing efficiency and accuracy, in addition to significantly reducing the manual and tactical resource intensive efforts with creating and defining automated workflows.

Aspects of present disclosure are directed to systems, methods, and non-transitory computer readable media for managing networked environments. A computer system having one or more processors coupled with memory may provide a user interface for configuring a plurality of groups of servers each hosting a resource for an application. The user interface may include: a first element configured to select, upon interaction, at least one group of servers from the plurality of groups of servers to which to install a patch for the application; a second element configured to identify, upon interaction, a first group of servers of the plurality of groups of servers to which to transfer network traffic associated with the application and communicated with a second group of servers of the plurality of groups of servers; and a third element configured to provide, upon interaction, one or more performance indicators for at least one of a plurality of functions of the application.

The computing system may execute, responsive to a first interaction with the first element, a patch management process by shutting down the selected at least one group of servers, installing the patch for the application on the at least one group of servers, and validating installation of the patch. The computing system may perform, responsive to a second interaction with the second element, a traffic fail over process by transferring the network traffic associated with the application from the second group of servers to the first group of servers. The computing system may provide, responsive to a third interaction with the third element, a performance indicator for a function of the plurality of functions of the application based on rolling historical data for the function.

In one embodiment, the computing system may apply the rolling historical data of the function to a machine learning (ML) model to determine the performance indicator identifying a predicted likelihood of the application successfully carrying out the function. In another embodiment, the computing system may select, from a plurality of performance indicators, the performance indicator based on a comparison between a performance metric for the function and a threshold value. In yet another embodiment, the computing system may determine the threshold value with which to compare against the performance metric for the function based on the historical rolling data for the function.

In yet another embodiment, the user interface may include a fourth element configured to provide, upon interaction, metrics over time for the function selected from the plurality of functions. The computing system may generate a plurality of performance metrics over time based on the historical rolling data used to provide the performance indicator.

In yet another embodiment, the user interface may include a fourth element configured to provide, for each of the plurality of groups of servers, a respective status indicator identifying whether the patch has been installed on a corresponding group of servers. In yet another embodiment, the user interface may include a fourth element configured to provide, for each of the plurality of groups of servers, a respective statistic indicator on the network traffic associated with the application at a corresponding group of servers.

In yet another embodiment, the user interface may include a fourth element configured to set, upon interaction, a schedule for executing the patch management process of the at least one group of servers. The computing system may execute the patch management process in accordance with the schedule set using the fourth element. In yet another embodiment, the computing system may identify a first stack in the first group of servers corresponding to a second stack in the second group of servers configured to host the application. In yet another embodiment, the plurality of groups of servers may be arranged by at least one of: application type, geographic location, or serving device type.

Aspects of present disclosure are directed to systems, methods, and non-transitory computer readable media for managing services. One or more processors may maintain a plurality of process flows to manage a plurality of services in a network. Each respective process flow of the plurality of process flows may identify: (i) a respective trigger to invoke the respective process flow to initiate a first process of a plurality of processes on at least one of the plurality of services; (ii) a plurality of nodes corresponding to the plurality of processes, each node of the plurality of nodes including a respective definition corresponding to a respective process of the plurality of processes; and (iii) at least one edge identifying a relationship between a first node and a second node of the plurality of nodes. The relationship may identify a second process of the plurality of processes to be executed in response to completion of execution of the first process corresponding to the first node. The one or more processors may select, responsive to detecting a trigger, a process flow from the plurality of process flows based on the trigger. The one or more processors may execute, in accordance with a corresponding definition of a node of the plurality of nodes of the process flow, at least one process of the plurality of processes on at least one of the plurality of services in the network. The one or more processors may generate an output from executing the at least one process of the process flow.

In one embodiment, the one or more processors may provide a user interface to define process flows, the user interface element comprising a plurality of user interface elements. The plurality of user interface elements may include (i) a first user interface element to add, responsive to interaction with the first user interface element, one or more nodes corresponding to one or more processes to be executed on one or more of the plurality of services, and (ii) a second user interface elements to add, responsive to interaction with the second user interface element, one or more edges among the one or more nodes. The one or more edges may correspond to one or more relationships among the one or more processes corresponding to the one or more nodes.

In another embodiment, the one or more processors may receive, via one or more of the plurality of user interface elements of the user interface, a flow definition of the process flow identifying the plurality of nodes and at least one edge. The one or more processors may generate the process flow in accordance with the flow definition received via the user interface. In yet another embodiment, the one or more processors may provide the user interface comprising a region onto which (i) one or more first objects corresponding to the one or more nodes are added responsive to the interaction with the first user interface element and (ii) one or more second objects corresponding to the one or more edges are added responsive to the interaction with the second user interface element.

In yet another embodiment, the process flow may include a failover process flow. The one or more processors may execute the first process corresponding to the first node to identify a first plurality of servers available to host resources for a second plurality of servers to provide a service. The one or more processors may execute the second process corresponding to the second node identified by the at least one edge as having the relationship with the first node, to transfer network traffic of the service from the second plurality of servers to the first plurality of servers.

In yet another embodiment, the process flow may include an anomaly detection flow, and the trigger may include a detection of an anomaly in at least one service of the plurality of services in the network. The one or more processors may execute the first process corresponding to the first node to select, from a plurality of self-healing measures, a self-healing measure in response to the anomaly in the at least one service. The one or more processors may execute the second process corresponding to the second node identified by the at least one edge as having the relationship with the first node. The second process may be to carry out the self-healing measure. The one or more processors may execute a third process corresponding to a third node identified by a second edge as having a second relationship with the second node. The third process may validate resolution of the anomaly on the at least one service from carrying out the self-healing measure.

In yet another embodiment, the process flow may include a certificate management flow, and the trigger may identify an expiration of a first certificate on a service on the plurality of services. The one or more processors may execute the first process corresponding to the first node to renew the first certificate by generating a second certificate to provide to the service, in response to the expiration. The one or more processors may execute the second process corresponding to the second node identified by the at least one edge as having the relationship with the first node. The second process may provide the second certificate to the service. The one or more processors may execute a third process corresponding to a third node identified by a second edge as having a second relationship with the second node. The third process may be to validate renewal.

In yet another embodiment, the one or more processors may identify, from the process flow, a state corresponding to the at least one process, the state corresponding to the node including the definition of the at least one process. The one or more processors may execute the at least one process corresponding to the state of the process flow. In yet another embodiment, the one or more processors may monitor for the trigger to invoke the process flow. The trigger may include at least one of: a manual execution of the process flow, a detection of an event in the network, a scheduled time to execute the process flow, or a completion of execution of a second process flow. In yet another embodiment, the one or more processors may generate the output indicating a status of execution of the process flow in the plurality of services in the network.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

FIG. 4 depicts a screenshot of an execution interface in the dashboard user interface for the system for patch management in accordance with an illustrative embodiment;

FIG. 14 depicts a screenshot of an on-boarding interface in the dashboard user interface for the system for site reliability evaluation in accordance with an illustrative embodiment;

FIG. 15 depicts a screenshot of a reliability indication interface in the dashboard user interface for the system for site reliability evaluation in accordance with an illustrative embodiment;

FIG. 19 depicts a screenshot of a health check interface in the dashboard user interface for the system for services assistance in accordance with an illustrative embodiment;

FIG. 20 depicts a screenshot of a query interface in the dashboard user interface for the system for services assistance in accordance with an illustrative embodiment;

FIGS. 25A and 25B each depict a screenshot of an administration interface for process flows in the system for executing process flows, in accordance with an illustrative embodiment;

DETAILED DESCRIPTION

Figure 1:
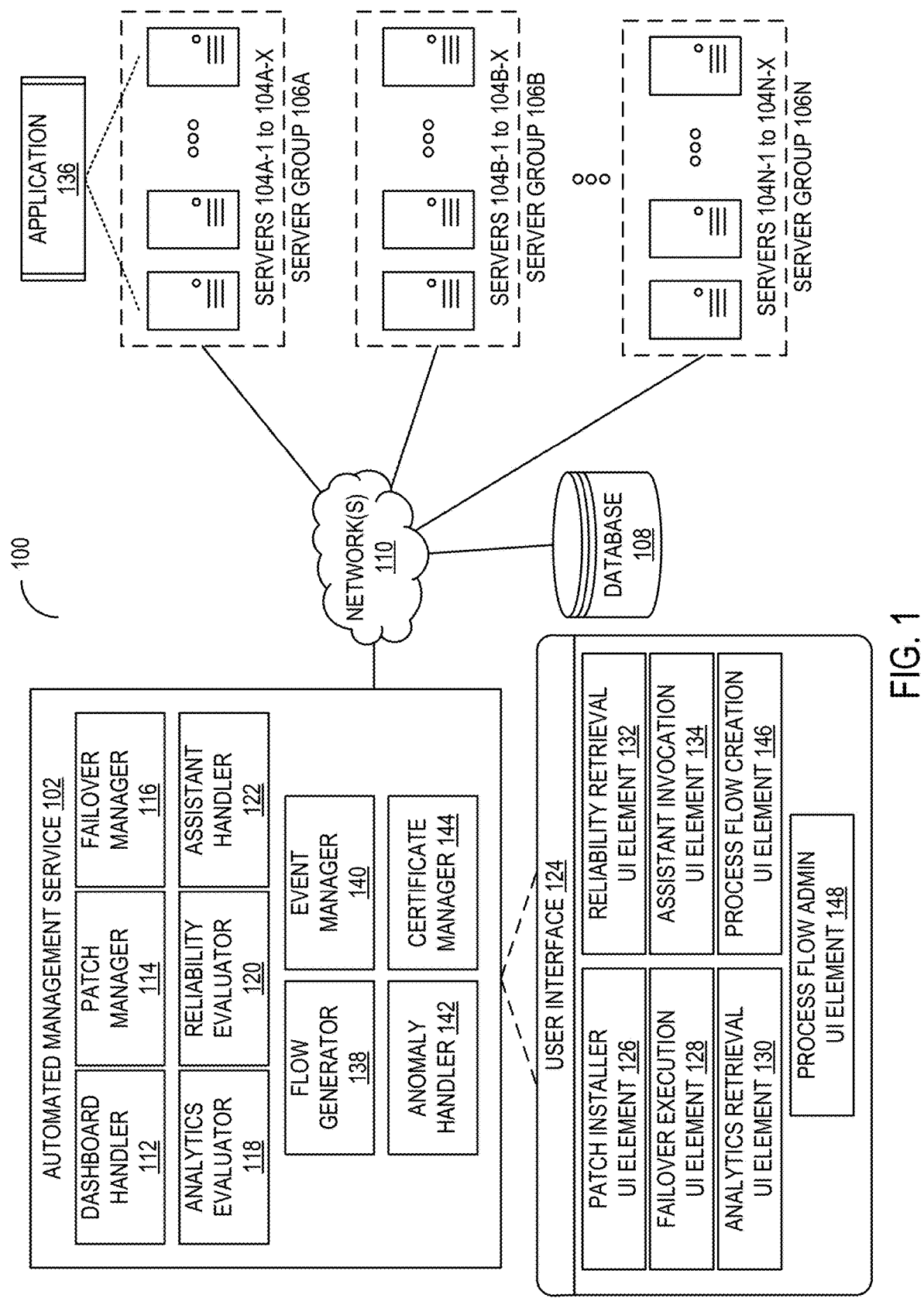
FIG. 1 depicts a block diagram of a system for managing networked environments in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods for managing networked environments. An automated management service may aggregate data from servers hosting applications accessed by end-user devices and provide a dashboard user interface to administer and manage various operations of the network environment. The dashboard user interface may include: a patch installation element to initiate a patch management process to at least one set of servers; a failover execution element to carry out a network traffic failover from one set of servers to another set of servers; and a predictive analytics element to provide a set of performance indicators for various functions of a given application, among others.

In addition, the automated management service may provide a user interface to define process flows for carrying out a set series of processes on the network environment in response to detection of a trigger (e.g., manual execution or occurrence of an event). In this manner, the automated management service may allow the network administrator to quickly retrieve desired data (e.g., statistics and performance metrics) about the network and promptly take proper actions to manage various aspects of network operations. The automated management service may also enable to network administrator to customize or tailor countermeasures to be automatically executed to address issues in accordance with the defined process flows.

FIG. 1 depicts a block diagram of a system 100 for managing networked environments. In overview, the system 100 may include at include at least one automated management service 102, one or more servers 104A-1 to 104N-X (hereinafter generally referred to as servers 104) arranged, situated, or distributed across a set of server groups 106A-N (hereinafter generally referred to as server groups 106); and at least one database 108, among others, communicatively coupled with one another via at least one network 110. The automated management service 102 may include at least one dashboard handler 112, at least one patch manager 114, at least one failover manager 116, at least one analytics evaluator 118, at least one reliability evaluator 120, at least one assistant handler 122, at least one flow generator 138, at least one event manager 140, at least one anomaly handler 142, and at least one certificate manager 144, among others. The automated management service 102 may provide at least one user interface 124. The user interface 124 may include at least one patch installer user element (UI) element 126, at least one failover execution UI element 128, at least one analytics retrieval UI element 130, at least one reliability retrieval UI element 132, at least one assistant invocation UI element 134, at least one process flow creation UI element 146, and at least one process flow administration UI element 148, among others. The one or more servers 104 in at least one server group 106 may include or host at least one application 136.

Various hardware and software components of one or more public or private networks 110 may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols, among others.

Each server 104 may be any computing device comprising one or more processors coupled with memory and software and capable of performing the various processes and tasks described herein. Each server 104 may be in communication with one another, one or more end-user customer devices, the automated management system 102, and the database 108, among others via the network 110. The server 104 may be situated, located, or otherwise associated with at least one server group 106. Each server group 106 may correspond to a data center, a branch office, or a site at which a subset of servers 104 is situated or associated. For instance, the first server group 106A may correspond to a data center at first site including a first set of servers 104A-1 to 104A-X and the second server group 106B may correspond to a branch office at a second side including a second set of servers 106B-1 to 106B-X.

At least one of the servers 104 may maintain, include, or otherwise host resources for the application 136. The application 136 may be a cloud-based application (e.g., a Software as a Service (SaaS)), a web application, or a service, among others, accessed by end-user customer devices that are communicatively coupled with the network 110. For example, the application 136 may be an online banking application, a word processor, a spreadsheet program, a multimedia player, a video game, or a software development kit, among others. In some embodiments, the server 104 may include or run the application 136 itself. For instance, the server 104 may maintain or run virtual machine to run instances of the application 136 to be accessed by the end-user customer devices. One or more servers 104 may host or support resources for a service accessible to the end-user customer devices. In some embodiments, the servers 104 may be grouped, associated with one another, or otherwise arranged into the server group 106 by: a type of the application 136 provided; a geographic location; a network location; or a type of device (e.g., the end-user customer devices such as mobile phones, laptops, or desktops), among others.

The database 108 may store and maintain various data associated with the servers 104 across the server groups 106 and with the application 136 hosted thereon, among others. The database 108 may also include a database management system (DBMS) to arrange and organize the data maintained thereon. The data may be produced from the application 136 running on the servers 104 and accessed by end-user customer devices over the network 110. Upon production, the servers 104 (or the end-user customer devices) may store the data onto the database 108. For instance, the database 108 may store and maintain a transaction log identifying communications exchanged over the network 110, such as between end-user customer device and the servers 104. The database 108 may store and maintain a process log for a given application 136 identifying functions, events, or otherwise component invoked in the application 136 when running on the servers 104 or when accessed by the end-user customer devices. The data maintained on the database 108 may be accessed by the automated management service 102.

The automated management service 102 may be any computing device comprising one or more processors coupled with memory and software and capable of performing the various processes and tasks described herein. The automated management service 102 may be in communication with the servers 104 across different server groups 106, one or more end-user customer devices, and the database 108, among others via the network 110. Although shown as a single component, the automated management service 102 may include any number of computing devices. For instance, the dashboard handler 112, the patch manager 114, the failover manager 116, the analytics evaluator 118, the reliability evaluator 120, and the assistant handler 122 may be executed across one or more computing systems.

Within the automated management service 102, the dashboard manager 112 may provide the user interface 124 for display of a computing device communicatively coupled with the automated management server 102. The patch manager 114 may execute a patch installation process for the application 136 hosted on the servers 104. The failover manager 116 may perform a traffic failover process from one server group 106 to another server group 106. The analytics evaluator 118 may provide performance indicators for various functions of a given application. The reliability evaluator 120 may provide reliability indicators in accordance with service level objectives (SLOs). The assistant handler 122 may provide a service assistant to handle health checks and incident ticking for the application 136 or any of the servers 104. The flow generator 138 may use definitions received via user input to create and modify process flows to be executed on the services. The event manager 140 may monitor for triggers to invoke process flows and execute processes of the process flow. The anomaly handler 142 may handle anomalies detected among the services by carrying out self-healing processes. The certificate manager 144 may interface with inter The user interface 124 may be a graphical user interface (GUI), with one or more elements to invoke various functions of the automated management system 102. Upon interaction, the patch installer UI element 126 may invoke the patch manager 114 to execute the patch installation process. The failover execution UI element 128 may invoke the failover manager 116 to perform a traffic failover process from one server group 106 to another server group 106. The analytics retrieval UI element 130 may invoke the analytics evaluator 118 to provide performance indicators for various functions of the application 136. The reliability retrieval UI element 132 may invoke the reliability evaluator 120 to provide reliability indicators. The assistant invocation UI element 134 may invoke the assistant handler 122 to provide a service assistant to handle health checks and incident ticking. The process flow creation UI element 146 in conjunction with the flow generator 138 may be used to define and create process flows. The process flow administration UI element 148 may be used by the event manager 140 to present a status of each process flow. The user interface 124 may be for example in the manner depicted in FIG. 2.

Figure 2:
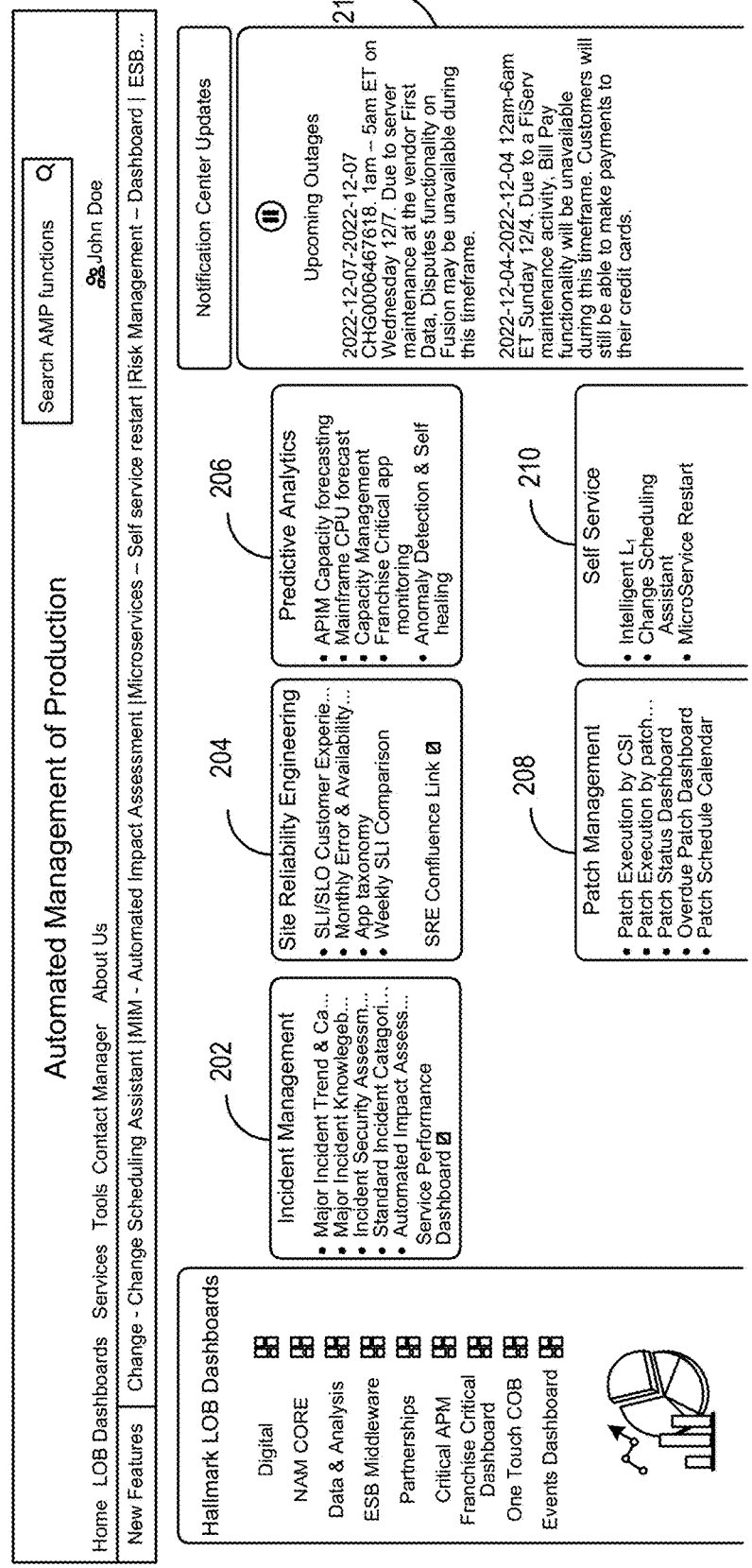
FIG. 2 depicts a screenshot of an dashboard user interface of the system for managing networked environments in accordance with an illustrative embodiment.

FIG. 2 depicts a screenshot of a dashboard user interface 200 of the system for managing networked environments. In the depicted example, the dashboard user interface 200 may include a set of elements generally in the middle of the interface, such as: a first UI element 202 to open incident management (e.g., including failover management); a second UI element 204 to open site reliability measurements; a third UI element 206 to access predictive analytics; a fourth UI element 208 to access patch management; and a fifth UI element 210 to invoke the intelligent customer service agent, among others. The dashboard user interface 200 may also include at least one sixth element 212 to provide notifications and updates. The dashboard user interface 200 may include other UI elements, such as a tool bar along the top and access to other dashboards along the left.

Figure 3:
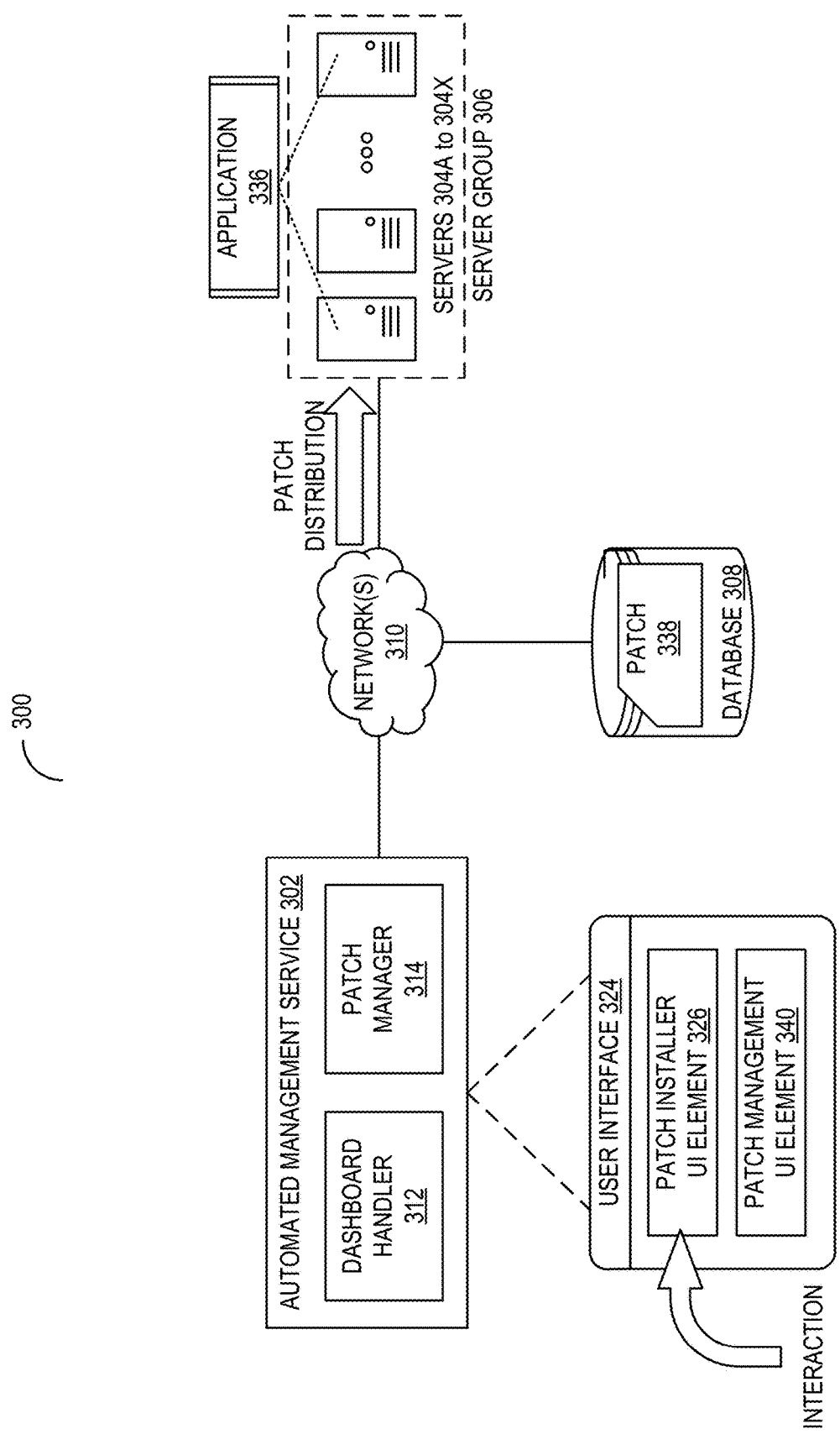
FIG. 3 depicts a block diagram of a system for patch management in networked environments in accordance with an illustrative embodiment.

FIG. 3 depicts a block diagram of a system 300 for patch management in the networked environment. The system 300 may include at least one automated management service 302, one or more servers 304A-X (hereinafter generally referred to as servers 304) in a server group 306, and at least one database 308, among others, communicatively coupled with one another via at least one network 310. The automated management service 302 may include at least one dashboard handler 312 and at least one patch manager 314, among others, and may provide at least one user interface 324. The user interface 324 may include at least one patch installer UI element 326 and the patch management UI element 328, among others. At least one of the servers 304 may host resources for at least one application 336. The automated management service 302 may be used to facilitate installation of at least one patch 338 to the application 336. Embodiments may comprise additional or alternative components or omit certain components from those of FIG. 3, and still fall within the scope of this disclosure.

The dashboard handler 312 executing on the automated management service 302 may provide the user interface 324 including the patch installer UI element 326. The user interface 324 may be rendered, displayed, or otherwise presented on at least one display of the automated management service 302 or communicatively coupled with the automated management service 302. The user interface 324 may be in the manner, for example, depicted in FIGS. 4 and 5, among others. The patch installer UI element 326 may correspond to at least one graphical user interface (GUI) element within the user interface 324, such as a command button, a slider, a toggle switch, an Image, a window, a prompt, or a container, among others, or any combination thereof. The dashboard handler 312 may monitor for an interaction with the patch installer UI element 326, such as a mouse click, a screen touch, a key press, voice command, or a corresponding gesture, among others. The patch installer UI element 326 may identify or select at least one server group 306 from a set of groups of servers on which to set up install at least one patch 338 for the application 336 hosted at least one of the servers 304 in the server group 306. In response to detecting an interaction with the patch installer UI element 326, the dashboard handler 312 may call, invoke, or otherwise execute the patch manager 314.

In some embodiments, the dashboard handler 312 may provide the user interface 324 to include at least one patch management UI element 340. The patch management UI element 340 may correspond to a set of graphical user interface (GUI) elements within the user interface 324, such as a radio button, a check box, a toggle switch, a text box, an image, a window, a prompt, or a container, among others, or any combination thereof. In some embodiments, the patch management UI element 340 may be part of the patch installer UI element 326 within the user interface 324. For example, the dashboard handler 312 may present the patch management UI element 340 corresponding to a subset of constituent GUI elements of the patch installer UI element 326. In some embodiments, the patch management UI element 340 may be separate from the patch installer UI element 326 within the user interface 324. For instance, the dashboard handler 312 may present the patch management UI element 340 on a window or webpage separate from the patch installer UI element 326.

In some embodiments, the patch management UI element 340 may include or provide information associated with the application 336, the servers 304, and server groups 306, among others. The patch management UI element 340 may provide information relevant to the installation of the patch 338 for the application 336. For instance, the patch management UI element 340 may include: a version identifier for the application 336 currently installed on each server 304 or server group 306; an identifier for each server 304 or server group 306 on which the application 336 is installed; a status indicating a progress (e.g., downloading, setting up, validation, and completion) of installation of the patch 338 at the respective server 304 or server group 306; and a time stamp for the status, among others.

In some embodiments, the patch management UI element 340 may accept, gather, or otherwise receive one or more parameters for the installation of the patch 338 for the application 336. The parameters may define a set of stages of the setup process of the patch 338 on the server 304 or the server group 306 for the application 336 and may be entered by a user (e.g., a network administrator) of the automated management service 302. The parameters may include, for example: an application identifier referencing the application 336; a version identifier corresponding to the patch 338 for the application 336 to be installed; an identification of a selected server 304 or server group 306 on which to carry out installation of the patch 338; and a schedule for the installation of the patch 338 for the application 336, among others. The schedule may define a time at which to carry out the stage of the installation process of the patch 338. In invoking the patch manager 314, the dashboard handler 312 may pass the parameters inputted into the patch management UI element 340.

The patch manager 314 executing on the automated management service 302 may carry out, perform, or otherwise execute a patch management process, in response to the interaction on the patch installer UI element 326. The patch management process may include the set of stages of installing the patch 338 for the application 336 whose resources are hosted on the selected server 304 or server group 306. The patch management process may start from a shutting down of the servers 304 hosting resources for the application 336 in the selected server group 306, setting up or installing the patch 338 for the application 336 on the servers 304, and validating the installation of the patch 338, among others. The patch manager 314 may carry out the patch management process in accordance with the defined parameters upon invocation from interaction with the patch installer UI element 326, with minimal or no subsequent user interaction. In this manner, the patch manager 314 may automate the various stages of installation of the patch 338 to reduce manual human involvement.

In carrying out the patch management process, the patch manager 314 may retrieve, obtain, or otherwise identify the patch 338 to be installed. The patch 338 may be stored and maintained in a storage (e.g., the database 308 as depicted) accessible to the automated management service 302. The patch 338 may define, identify, or otherwise include a set of updates to be applied to the application 336. The updates included in the patch 338 may include, for example, addition of new functions, removal of previously provided functions, or modifications to existing functions in the application 336. In some embodiments, the patch manager 314 may identify which patch 338 is to be installed, using the inputs from the patch installer UI element 326 and the patch management UI element 340 of the user interface 324.

With the identification, the patch manager 314 may send, transmit, or otherwise provide the patch 338 to the selected sever 304 or server group 306. In conjunction, the patch manager 314 may run a shutdown sub-process the selected server 304 or server group 306 hosting resources for the application 336. The shutdown sub-process may entail, involve, or include causing the servers 304 in the server group 306 offline to cease further access by the end-user customer devices. Upon shutting down, the patch manager 314 may carry out setting up or installation of the patch 338 for the application 336. To set up, the patch manager 314 may run or execute the patch 338 to apply the set of updates to the application 336, for example, by changing executable binary files corresponding to the application 336.

Continuing on, the patch manager 314 may perform a validation sub-process (sometimes herein referred to as a post-patch check) on the installation of the patch 338. In performing, the patch manager 314 may determine whether the patch 338 is successfully installed on the server 304 or server group 306, without affecting other processes on the server 304 or server group 306. When the installation is unsuccessful, the patch manager 314 may return an indication for presentation on the user interface 324 (e.g., via the patch management UI element 340). In some embodiments, the patch manager 314 may perform the stages of the patch management process (e.g., the shutdown, setup, and validation) in accordance with the defined parameters. For example, the patch manager 314 may carry out individual sub-processes in accordance with the times identified by the schedule defined using the patch management UI element 340.

FIG. 4 depicts a screenshot of an execution interface 400 in the dashboard user interface for the system for patch management. In the depicted example, the execution interface 400 may include a list of applications 402 to indicate statuses of patch installations. The list 402 may include various information about the patch status, such as: a product name 404 to identify a type of application; a data center name 406 to identify a server group hosting the application; an operating system type 408 to identify the operating system at the server group; a validation status 410 identifying progress or completion of validation of the patch installation; and a patch status 412 identifying a progress of the overall patch installation process for the given application. The execution interface 400 may be used by the network administrator to view the patch status of various application across multiple sites.

Figure 5:
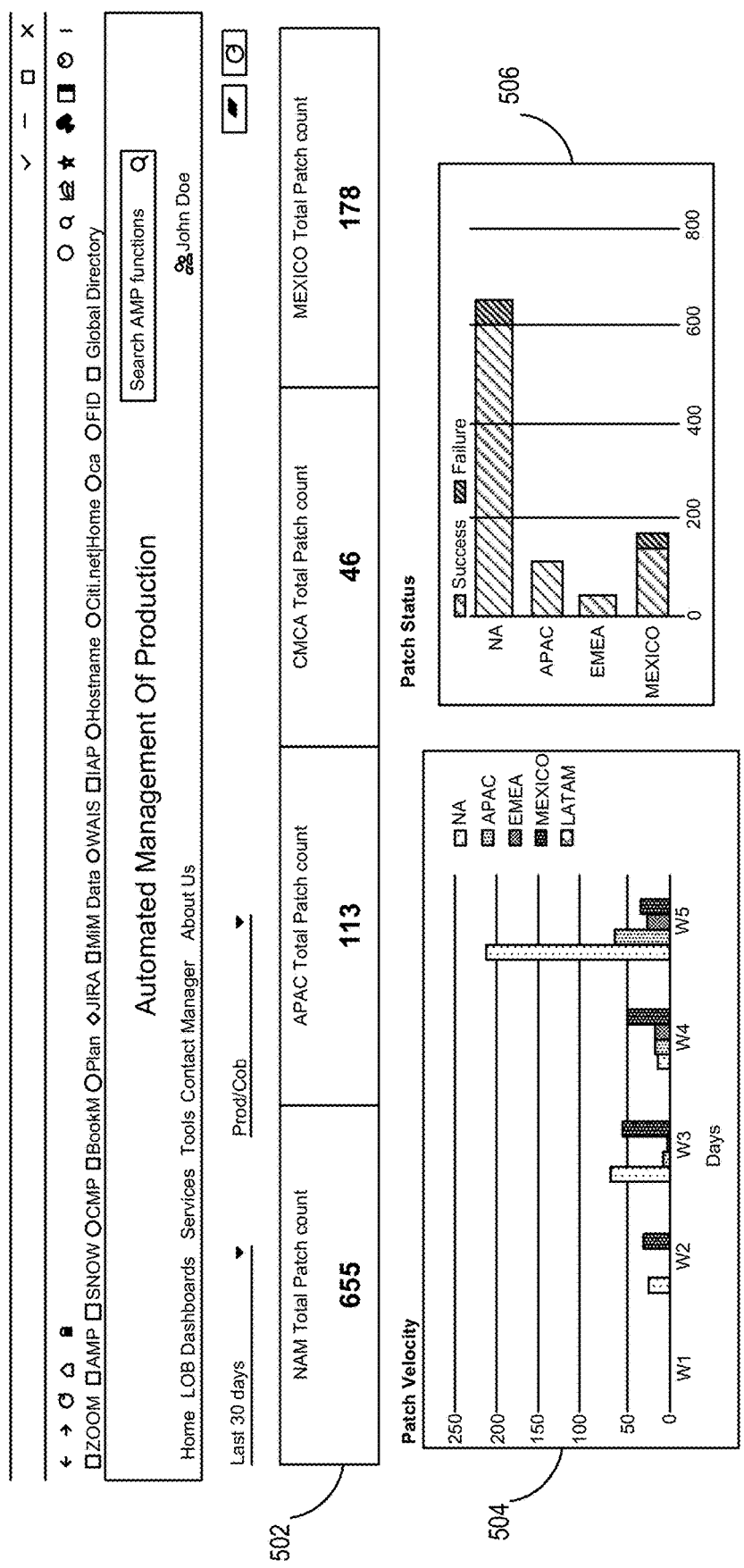
FIG. 5 depicts a screenshot of a status interface in the dashboard user interface for the system for patch management in accordance with an illustrative embodiment.

FIG. 5 depicts a screenshot of a status interface 500 in the dashboard user interface for the system for patch management. In the depicted example, the status interface 500 may include various information on the status of patch installation management across multiple server groups or sites. The status interface 500 may include: a patch count interface 502 identifying a number of patches installed by sites or server groups; a patch velocity interface 504 identifying a rate at which the patch management process is successfully carried out by sites or server groups; and a patch status interface 506 identifying a number of patch management processes that were either successful or failed. The status interface 500 may be used by the network administrator to view statistics regarding the patch installation process across multiple sites for a given application.

Figure 6:
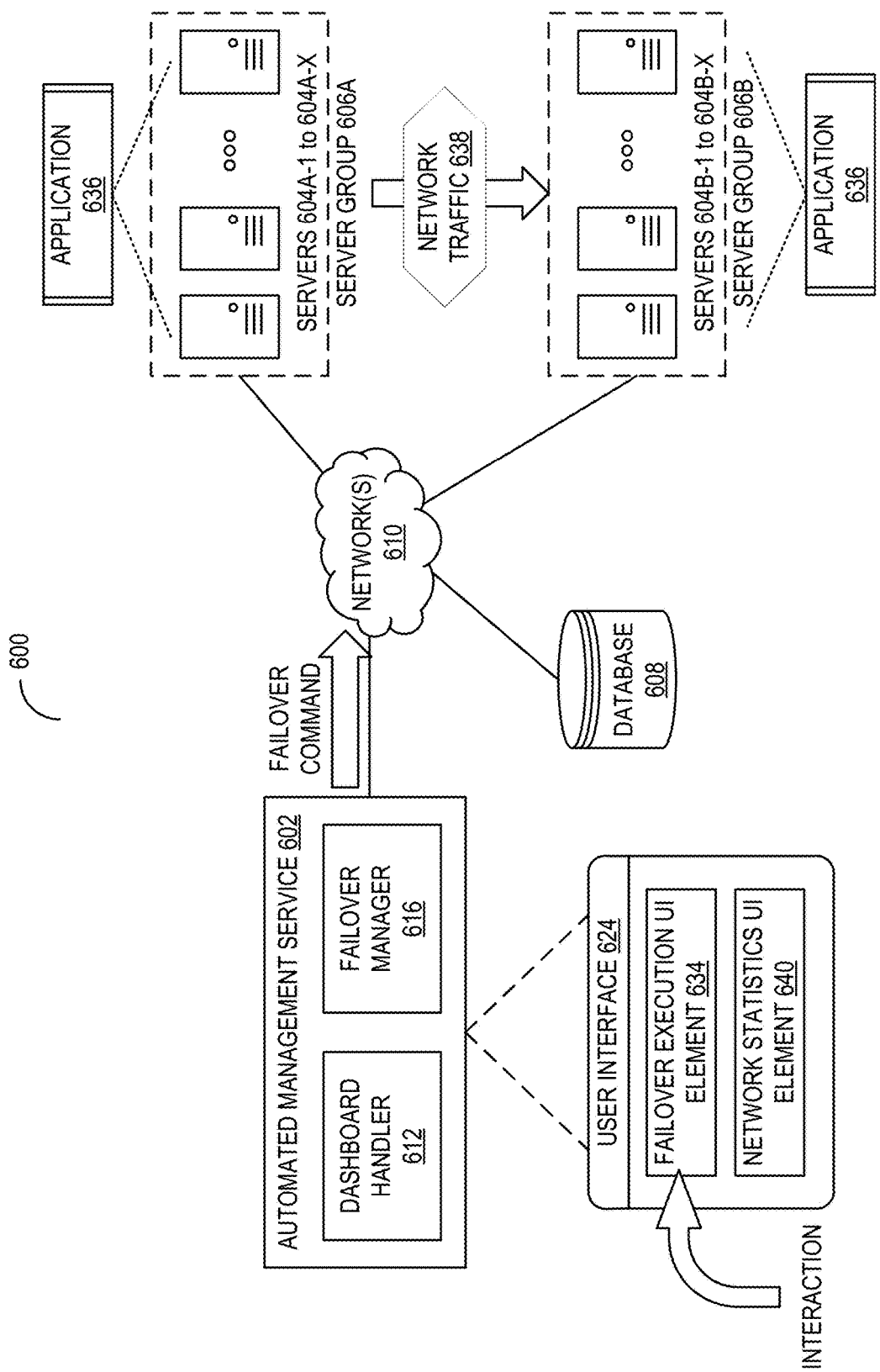
FIG. 6 depicts a block diagram of a system for failover management in networked environments in accordance with an illustrative embodiment.

FIG. 6 depicts a block diagram of a system 600 for failover management in networked environments. The system 600 may include at least one automated management service 602, one or more servers 604A-1 to 604B-X (hereinafter generally referred to as servers 604) across at least two server groups 606A and 606B (hereinafter generally referred to as server group 606), and at least one database 608, among others, communicatively coupled with one another via at least one network 610. The automated management service 602 may include at least one dashboard handler 612 and at least one failover manager 614, among others, and may provide at least one user interface 624. The user interface 624 may include at least one failover execution UI element 628 and at least one network statistics UI element 638, among others. At least one of the servers 604 in each server group 606 may host respective resources for at least one application 636. The server group 606 may facilitate network traffic 638 for communications between the end-user customer devices and the servers 604 to access resources for the application 636. Embodiments may comprise additional or alternative components or omit certain components from those of FIG. 6, and still fall within the scope of this disclosure.

The dashboard handler 612 executing on the automated management service 602 may provide the user interface 624 including the failover execution UI element 628. The user interface 624 may be rendered, displayed, or otherwise presented on at least one display of the automated management service 602 or communicatively coupled with the automated management service 602. The user interface 624 may be in the manner, for example, depicted in FIGS. 7-9, among others. The failover execution UI element 628 may correspond to at least one graphical user interface (GUI) element within the user interface 624, such as a command button, a slider, a toggle switch, a radio button, a check box, a text box, an image, a window, a prompt, or a container, among others, or any combination thereof.

The failover execution UI element 628 may be used to identify or select one server group 606B to which to transfer network traffic 640 associated with the application 636 from another server group 606A. In some embodiments, the failover execution UI element 628 may accept, gather, or otherwise receive one or more parameters for transferal of the network traffic 640 as part of the failover. The parameters may identify or include, for example, an application identifier corresponding to the application 636; a source identifier corresponding to the server group 606 from which the network traffic 640 is to be transferred (e.g., the server group 606A as depicted); and a destination identifier corresponding to the server group 606 to which the network traffic 640 is to be transferred (e.g., the server group 606B as depicted), among others.

The dashboard handler 612 may monitor for an interaction with the failover execution UI element 628 to initiate the failover, such as a mouse click, a screen touch, a key press, voice command, or a corresponding gesture, among others. The interaction may indicate a command to initiate the failover. In some embodiments, the dashboard handler 612 may also handle one or more interactions to the failover execute UI element 634 to enter or input the parameters defining the traffic failover. In response to detecting the interaction with the failover execution UI element 628 to initiate the failover, the dashboard handler 612 may call, invoke, or otherwise execute the failover manager 614. In invoking, the dashboard handler 612 may pass the input parameters to the failover manager 614.

The failover manager 616 executing on the automated management service 602 may carry out, perform, or otherwise execute a traffic failover process, in response to the interaction with the failover execution UI element 634. The traffic failover process may correspond to or include moving, switching, or otherwise transferring the network traffic 638 from one server group 606 to another server group 606 (e.g., from the first server group 606A to the second server group 606B as depicted). The network traffic 638 may have been previously communicated with the server group 606 (e.g., the first server group 606A) in providing end-user customer devices access to resources for the application 636. The failover manager 616 may execute the traffic failover process in accordance with the parameters input via the failover execution UI element 634.

From the parameters, the failover manager 616 may select or identify the server group 606 (e.g., the first server group 606A) referenced by the source identifier from which the network traffic 638 is to be transferred. In some embodiments, the failover manager 616 may find, select, or otherwise identify at least one stack (e.g., a subset of servers 606) within the server group 606 hosting resources for the application 636. The failover manager 616 may find, select, or otherwise identify the network traffic 638 associated with the application 636 hosted on one or more servers 604 of the identified server group 606 (e.g., the first server group 606A). The network traffic 638 may identify or include communications (e.g., data packets) exchanged between the servers 604 of the server group 606 and the end-user consumer devices in accessing the application 636.

In addition, the failover manager 616 may identify the server group 606 (e.g., the second server group 606B) to which the network traffic 636 is to be transferred. In some embodiments, the failover manager 616 may find, select, or otherwise identify at least one stack (e.g., a subset of servers 604) within the server group 606 corresponding to the stack in the other server group 606 to which the network traffic 638 is to be transferred. The stack may correspond to a subset of servers 604 already hosting resources for the application 636 or another instance of the application 636 hosted thereon. The stack may also correspond to the subset of servers 604 in the server group 606 with availability to handle such resources 636 or communications with the end-user consumer devices to access the application 636.

With the identifications, the failover manager 616 may instruct, command, or otherwise cause the servers 604 of the server group 606 (e.g., the server group 606A) to move or transfer the network traffic 638 to the servers 604 of the other server group 606 (e.g., the server group 606B). In moving over, the failover manager 616 may redirect or forward communications from the end-consumer devices accessing the application 636 on the initial server group 606 to the second server group 606. Subsequent to the failover, the end-user consumer devices and the servers 604 of the second server group 606 may exchange communications with each other in accessing the application 636. In this manner, the failover manager 616 may execute the traffic failover process in accordance with the defined parameters upon invocation from the interaction with the failover execution UI element 634. The failover manager 616 may automate the various operations involved in failover with minimal or no manual involvement.

In some embodiments, the failover manager 616 may calculate, determine, or otherwise generate at least one network statistic for each server group 606. The network statistic may identify or include a measure of performance of the network traffic 638 associated with the application 636 hosted on the servers 604 in the respective server group 606. The measure of performance may be a single instance or time-series of measurements. The network statistics may include, for example: latency measuring a delay between the end-user consumer devices with the servers 604 in accessing the application 636; bandwidth identifying a rate of data exchanged between the end-user consumer devices with the servers 604; throughput identifying an amount of data successfully communicated between the end-user consumer devices with the servers 604; jitter corresponding to a variation in latency in the exchanged communications; and an error rate identifying a rate of alterations of the data communicated between the end-user consumer devices with the servers 604 due to network conditions, among others, or any combination thereof. The network statistics may be instrumented by the failover manager 616 (or another computing device). With the generation, the failover manager 616 may store and maintain the network statistics for the server groups 606 on the database 608. In some embodiments, the servers 604 themselves may generate and store the network statistics as detailed herein on the database 608. In some embodiments, the failover manager 616 may relay or otherwise provide the network statistics for the server groups 606 to the dashboard handler 612 to present on the user interface 624.

In some embodiments, the dashboard handler 612 may provide the user interface 624 to include the network statistics UI element 640. The network statistics UI element 640 may correspond to a set of graphical user interface (GUI) elements within the user interface 624, such as a radio button, a check box, a toggle switch, a text box, a window, a prompt, or a container, among others. In some embodiments, the network statistics UI element 640 may be a part of the failover execution UI element 634. For instance, the GUI elements corresponding to the failover execution UI element 634 may be included in the window including the GUI elements of the network statistics UI element 640. In some embodiments, the failover execution UI element 634 may be separate from the network statistics UI element 640. For example, the dashboard handler 312 may present the network statistics UI element 640 in a top portion of the window and the failover execution UI element 634 on a bottom portion of the window.

The network statistics UI element 640 may include, identify, or otherwise provide information relevant to the traffic failover process, such as the network statistics. The dashboard handler 612 may retrieve, obtain, or otherwise identify the network statistics from the failover manager 616 or another data source (e.g., the database 608). The network statistics UI element 640 may include or identify the network statistics by application 636, server 604, or server group 606. For example, the network statistics UI element 640 may identify the latency, bandwidth, throughput, the jitter, the error rate, or a combined score for each application 636, server 604, or server group 606. In some embodiments, the dashboard handler 612 may present or provide an indicator for each network statistic. The indication may be, for instance, an enumeration identifier or a color code identifying whether the network statistic for a given application 636 is excellent, good, fair, or poor, among others. By displaying the network statistics in the network statistics UI element 640 in a digestible manner, a user (e.g., the network administrator) can determine whether to invoke the traffic failover process.

Figure 7:
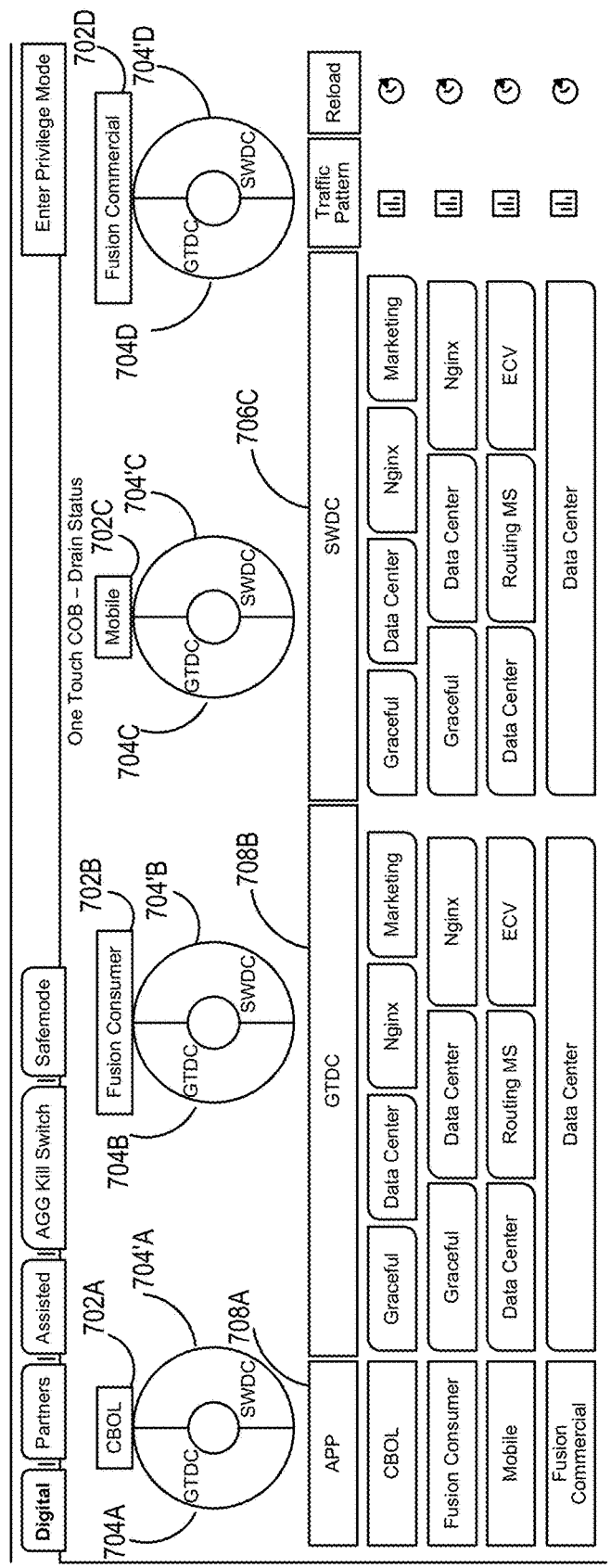
FIG. 7 depicts a screenshot of a network health interface in the dashboard user interface for the system for failover management in accordance with an illustrative embodiment.

FIG. 7 depicts a screenshot of a network health interface 700 in the dashboard user interface for the system for failover management. The network health interface 700 may identify network traffic statistics categorized by application and server groups. In the depicted example, generally along the top, the network health interface 700 may include a set of application name elements 702A-D identifying a type of application. For each application, the network health interface 700 may include a set of server group elements 704A-D and 704'A-D, each of which may identify network statistics for the given server group and application (e.g., using color coding). Generally along the bottom, the network health interface 700 may include a set of elements 706A-C identifying network statistics by applications. The network health interface 700 may be used by the network administrator to make decisions regarding whether to invoke network traffic failover process from one server group to another server group for a given application.

Figure 8A:
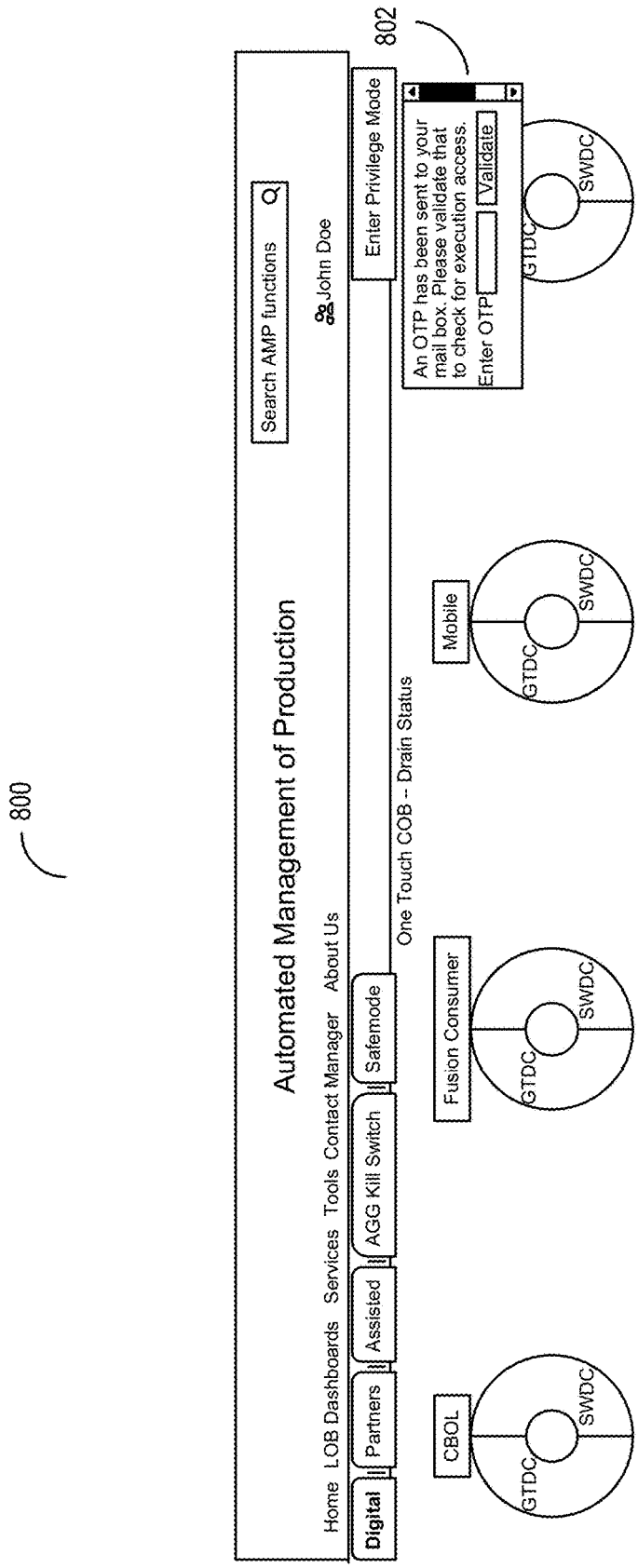
FIGS. 8A and 8B depict screenshots of an execution interface in the dashboard user interface for the system for failover management in accordance with an illustrative embodiment.
Figure 8B:
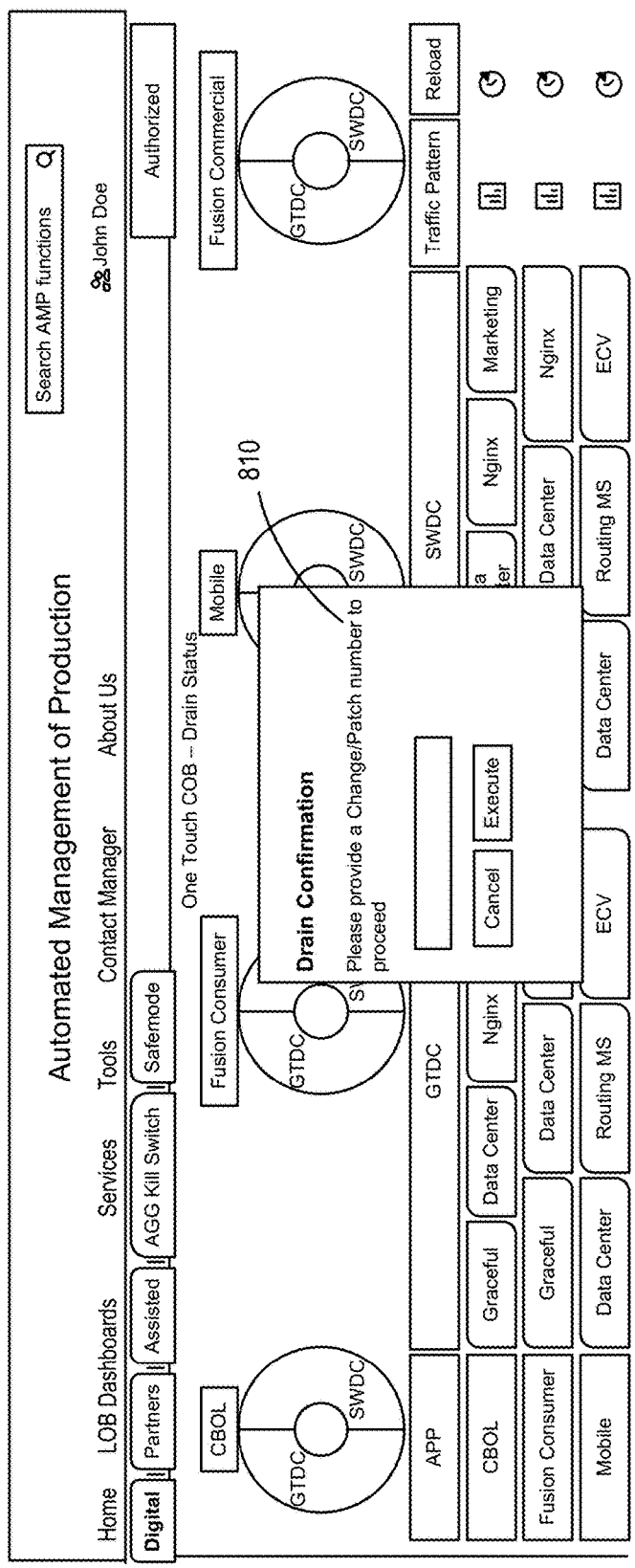

FIGS. 8A and 8B depict screenshots of an execution interface 800 in the dashboard user interface for the system for failover management. Starting with FIG. 8A, in the depicted example, the execution interface 800 may include an authentication interface 802 to initiate the traffic failover process. The authentication interface 802 may be used to enter a one-time password (OTP) to validate the network administrator prior to invoking the traffic failover process. Moving onto FIG. 8B, the execution interface 800 may a prompt 810 to enter the application patch identifier to select the application whose network traffic is to be transferred from one server group to another server group. The execution interface 800 may be used by the network administrator to carry out the traffic failover process.

Figure 9:
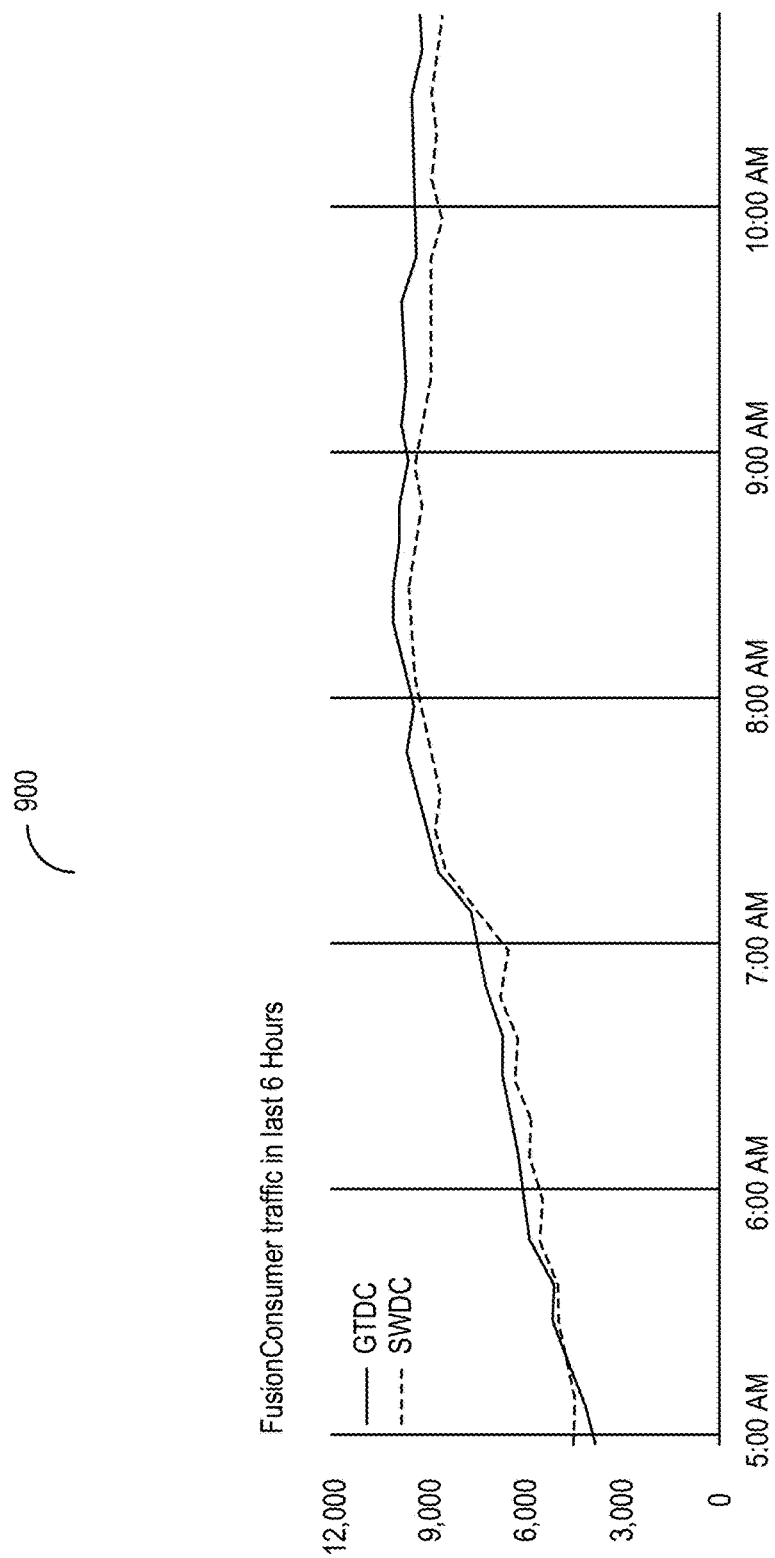
FIG. 9 depicts a screenshot of a traffic pattern interface in the dashboard user interface for the system for failover management in accordance with an illustrative embodiment.

FIG. 9 depicts a screenshot of a traffic pattern interface 900 in the dashboard user interface for the system for failover management. In the depicted example, the traffic pattern interface 900 may provide additional network statistics in relation to the network traffic for a given application categorized by host server groups (e.g., "GTDC" and "SWDC") over a given time window. The traffic pattern interface 900 may be used by the network administrator to decide whether to invoke the network traffic failover process from one server group to another server group for a given application.

Figure 10:
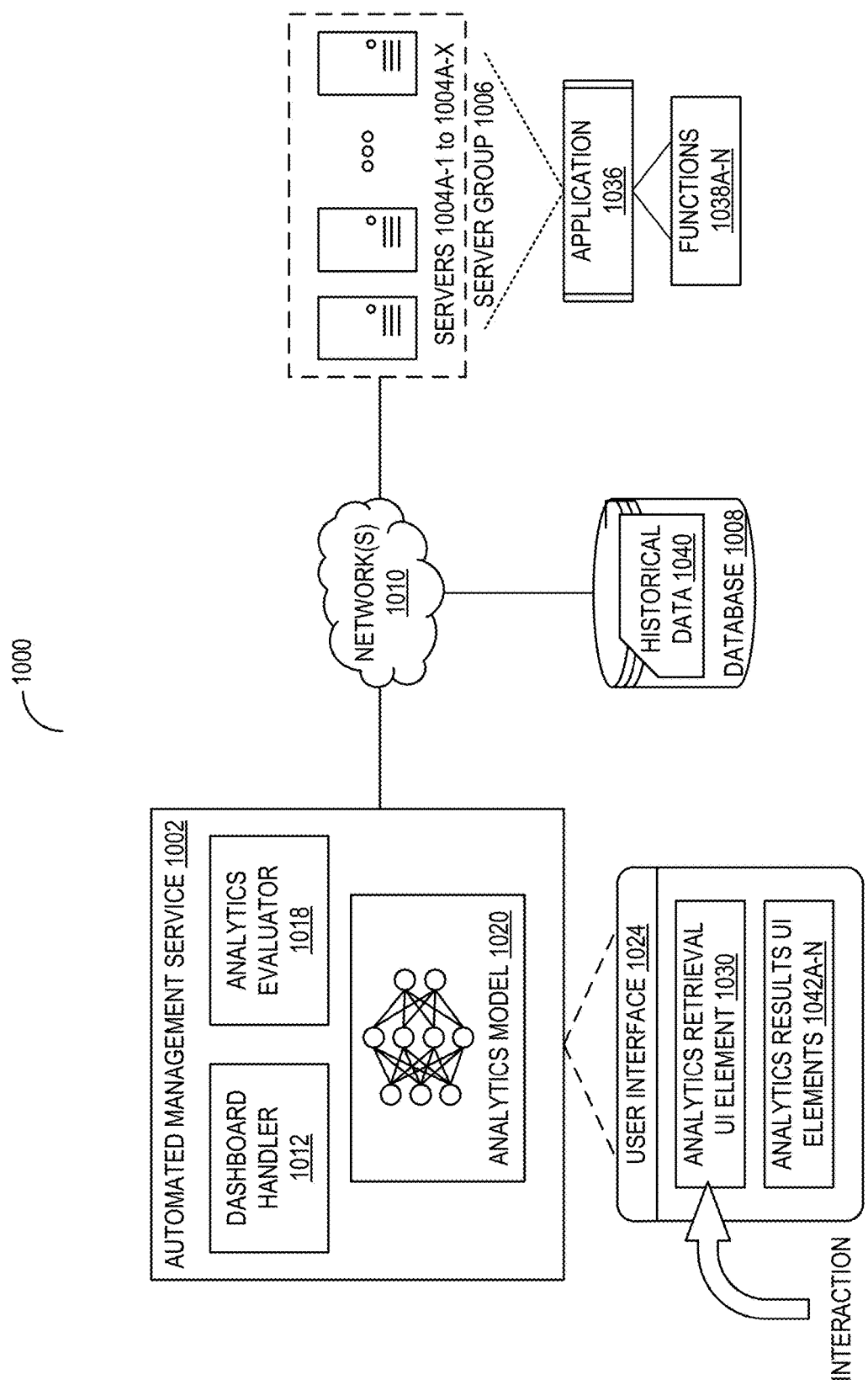
FIG. 10 depicts a block diagram of a system for performance analytics in networked environments in accordance with an illustrative embodiment.

FIG. 10 depicts a block diagram of a system 1000 for performance analytics in networked environments. The system 1000 may include at least one automated management service 1002, one or more servers 1004A-X (hereinafter generally referred to as servers 1004) in at least one server group 1006, and at least one database 1008, among others, communicatively coupled with one another via at least one network 1010. The automated management service 1002 may include at least one dashboard handler 1012, at least one analytics evaluator 1018, and at least one analytics model 1020, among others, and may provide at least one user interface 1024. The database 1008 may store, maintain, or otherwise include historical data 1040. The user interface 1024 may include at least one analytics retrieval UI element 1030 and a set of analytics results UI elements 1044A-N (hereinafter generally referred to as analytics results UI elements 1044), among others. At least one of the servers 1004 in at least one server group 1006 may host resources for at least one application 1036. The application 1036 may include a set of functions 1038A-N (hereinafter generally referred to as functions 1038). Embodiments may comprise additional or alternative components or omit certain components from those of FIG. 10, and still fall within the scope of this disclosure.

The dashboard handler 1012 executing on the automated management service 1002 may provide the user interface 1024 including the analytics retrieval UI element 1030. The analytics retrieval UI element 1030 may be rendered, displayed, or otherwise presented on at least one display of the automated management service 1002 or communicatively coupled with the automated management service 1002. The analytics retrieval UI element 1030 may correspond to at least one graphical user interface (GUI) element within the user interface 1024, such as a command button, a slider, a toggle switch, an image, a window, a prompt, or a container, among others, or any combination thereof. The user interface 1302 may be in the manner depicted, for example, in FIGS. 11 and 12, among others. The analytics retrieval UI element 1030 may provide performance indicators of the functions 1038 supported or provided by the application 1036. In response to detecting an interaction with the analytics retrieval UI element 1030, the dashboard handler 1012 may call, invoke, or otherwise execute the analytics evaluator 1018.

The analytics evaluator 1018 executing on the automated management service 1002 may calculate, determine, or otherwise generate a set of performance indicators for the corresponding set of functions 1038 of the application 1036, in response to the interaction with the analytics retrieval UI element 1030. The generation of the performance indicators may be based on historical data 1040 for the application 1036. The historical data 1040 may be stored and maintained on a storage (e.g., the database 1008) using instrumentation of the instance of the application 1036 on one or more of the servers 1004 across server groups 1006. For each function 1038 of the application 1036, the historical data 1040 may identify or include, for example: consumption of computing resources (e.g., processor or memory); a number of invocations (or requests); latency between requests and outputs; down time; success rate in carrying out; and an a number of errors or failures from performing the function 1038, among others, or any combination thereof. The historical data 1040 may be instrumented or measured on a rolling basis, with overlapping sampling intervals.

In generating, the analytics evaluator 1018 may calculate, generate, or otherwise determine a performance metric for each function 1038 of the application 1036 based on at least a portion of the historical data 1040. Each performance metric may identify a respective predicted likelihood that the application 1036 will execute or carry out a corresponding function 1038. The function 1038 may include one or more defined operations of the application 1036, such as account information retrieval in an online banking application, a copy and paste operation in a word processor application, account authentication on a video game, or a loading streaming multimedia on a video player, among others. The portion of the historical data 1040 may for example, correspond to one or more recent time intervals relative to the present. In some embodiments, the analytics evaluator 1018 may determine the performance metric based on a combination of the portion of the historical data 1040. The combination may be, for example, a summation, a weighted average, or a formula, among others, to generate the performance metric from the historical data 1040.

In conjunction, the analytics evaluator 1018 may calculate, generate, or otherwise determine a threshold value with which to compare against the performance metric. The threshold value may be determined based on at least a portion the historical data 1040. The portion of the historical data 1040 used to determine the threshold value may include more sampling time intervals than the portion of the historical data 1040 used to determine the performance metric. For example, the portion of the historical data 1040 used for the threshold value may correspond to the most recent week, whereas the portion of the historical data 1040 used to determine the performance metric may correspond to the most recent six hours. In some embodiments, the analytics evaluator 1018 may determine the threshold value based on a combination of the portion of the historical data 1040. The combination may be, for example, a moving average (e.g., weighted or exponential), a weighted sum, or a formula, among others.

With the determinations, the analytics evaluator 1018 may determine, identify, or otherwise select a performance indicator for each function 1038 of the application 1036. The performance indicator may be correlated with or identify the predicted likelihood of the application 1036 of successfully performing the function 1038. The performance indicator may be selected from a positive (or normal) performance indicator corresponding to the performance metric for the function 1038 satisfying (e.g., greater than or equal to) the associated threshold or a negative (or anomalous) performance indicator corresponding to the performance metric for the function 1038 not satisfying (e.g., less than) the associated threshold. To select, the analytics evaluator 1018 may compare the performance metric for the function 1038 with the corresponding threshold. If the performance metric for the function 1038 satisfies the threshold, the analytics evaluator 1018 may select the positive performance indicator. Otherwise, if the performance metric for the function 1038 does not satisfy the threshold, the analytics evaluator 1018 may select the negative performance indicator. Upon the determination, the analytics evaluator 1018 may provide the performance indicators and corresponding performance metrics for the functions 1038 of the application 1036 to the user interface 1024.

In some embodiments, the analytics evaluator 1018 may use the analytics model 1020 to determine the set of performance indicators for the set of functions 1038 of the application 1036. The analytics model 1020 may be, for example, a machine learning (ML) model to process historical data to output performance indicators. The architecture or algorithm used to implement the analytics model 1020 may include, for example, an artificial neural network (ANN), a clustering model (e.g., k nearest neighbors), a regression model (e.g., linear or logistic regression), a random forest, a Bayesian classifier, or a support vector machine (SVM), among others. In general, the analytics model 1020 may include: a set of inputs corresponding to at least a portion (e.g., the most recent time interval) of the historical data 1040; and at least one output corresponding to the positive or negative performance indicator; and a set of weights relating the inputs and outputs.

The analytics model 1020 may be initialized, trained, and established (e.g., by the analytics evaluator 1018 or another computing device) using a training dataset. The training dataset may identify or include the historical data 1040. The portion of the historical data 1040 used to train the analytics model 1020 may include sampling time intervals prior to the portion of the historical data 1040 to be fed into the analytics model 1020. For instance, the portion of the historical data 1040 may be from the previous two to five weeks of instrumentation, relative to the most recent sampling. For the training dataset, the input may correspond to the consumption of computing resources; a number of invocations; latency; and down time, among others included in one or more sampling intervals the historical data 1040. The expected outputs may include the positive or negative performance indicator for the corresponding sampling interval. The weights of the analytics model 1020 may be trained in accordance with supervised learning using the training data. The analytics model 1020 may be continuously trained with updated historical data 1040 from one or more previous intervals of time on a rolling basis.

With the establishment, the analytics evaluator 1018 may apply the portion of the portion (e.g., the most recent time intervals) of the historical data 1040 for each function 1036 of the application 1038 into the analytics model 1020. In applying, the analytics evaluator 1018 may feed the historical data 1040 as input into the analytics model 1020, and may process the historical data 1040 in accordance with the set of weights of the analytics model 1020. From processing, the analytics evaluator 1018 may produce or generate the performance indicator for the corresponding function 1038, output from the analytics model 1020. The analytics evaluator 1018 may repeat the applying of the portions of the historical data 1040 over the set of functions 1038 of the application 1036. With the determination of the performance indicators, the analytics evaluator 1018 may provide the performance indicators for the functions 1038 of the application 1036 to the user interface 1024.

The dashboard handler 1012 may provide the user interface 1024 to include the analytics results UI elements 1042. The analytics results UI elements 1042 may correspond to a set of graphical user interface (GUI) elements within the user interface 1024, such as a radio button, a slider, a check box, a toggle switch, a text box, an image, a window, a prompt, or a container, among others. In some embodiments, the analytics results UI elements 1042 may be a part of the analytics retrieval UI element 1030. For example, the analytics results UI elements 1042 may be included as part of the window of the analytics retrieval UI element 1030. In some embodiments, the analytics results UI elements 1042 may be separate from the analytics retrieval UI element 1030. For instance, the analytics retrieval UI element 1030 may reside on a main webpage, and the analytics results UI elements 1042 may be presented on a separate webpage upon interaction with the analytics retrieval UI element 1030.

Each analytics result UI element 1042 may correspond to a corresponding performance indicator of the respective function 1038 supported or provided by the application 1036. The indication may be, for instance, an enumeration identifier or a color code identifying whether the performance indicator for the respective function 1038 is positive (e.g., normal) or negative (e.g., anomalous), among others. For instance, the first analytics result UI element 1042A may correspond to an account information retrieval feature of an online banking application, and may have a green color to indicate that the feature is operating properly. The second analytics result UI element 1042B may correspond to a transaction feature of the online banking application, and may have a red color to indicate that the feature is non-operational or otherwise behaving abnormally. The displaying of the performance indicators in the set of analytics results UI elements 1042 in a digestible manner may allow a user (e.g., the network administrator) to diagnose any issues if any with the application 1036, the servers 1004 hosting the application 1036, or the server group 1006, among others.

In some embodiments, the dashboard handler 1012 may support or provide a drill-down feature for the performance indicator, upon interaction with at least one of the set of analytics results UI elements 1042. In response to the interaction with an analytics results UI element 1042, the dashboard handler 1012 may provide the performance metrics for the performance indication of the corresponding function 1038 of the application 1036. As discussed above, the performance metric may identify the predicted likelihood of success for the given function 1038. In some embodiments, in response to the interaction, the dashboard handler 1012 may provide at least a portion of the historical data 1040 for the corresponding function 1038. The portion of the historical data 1040 may identify of include metrics, such as consumption of computing resources, number of requests, latency, success rate, or number or rate of errors, among others, as discussed above.

Figure 11:
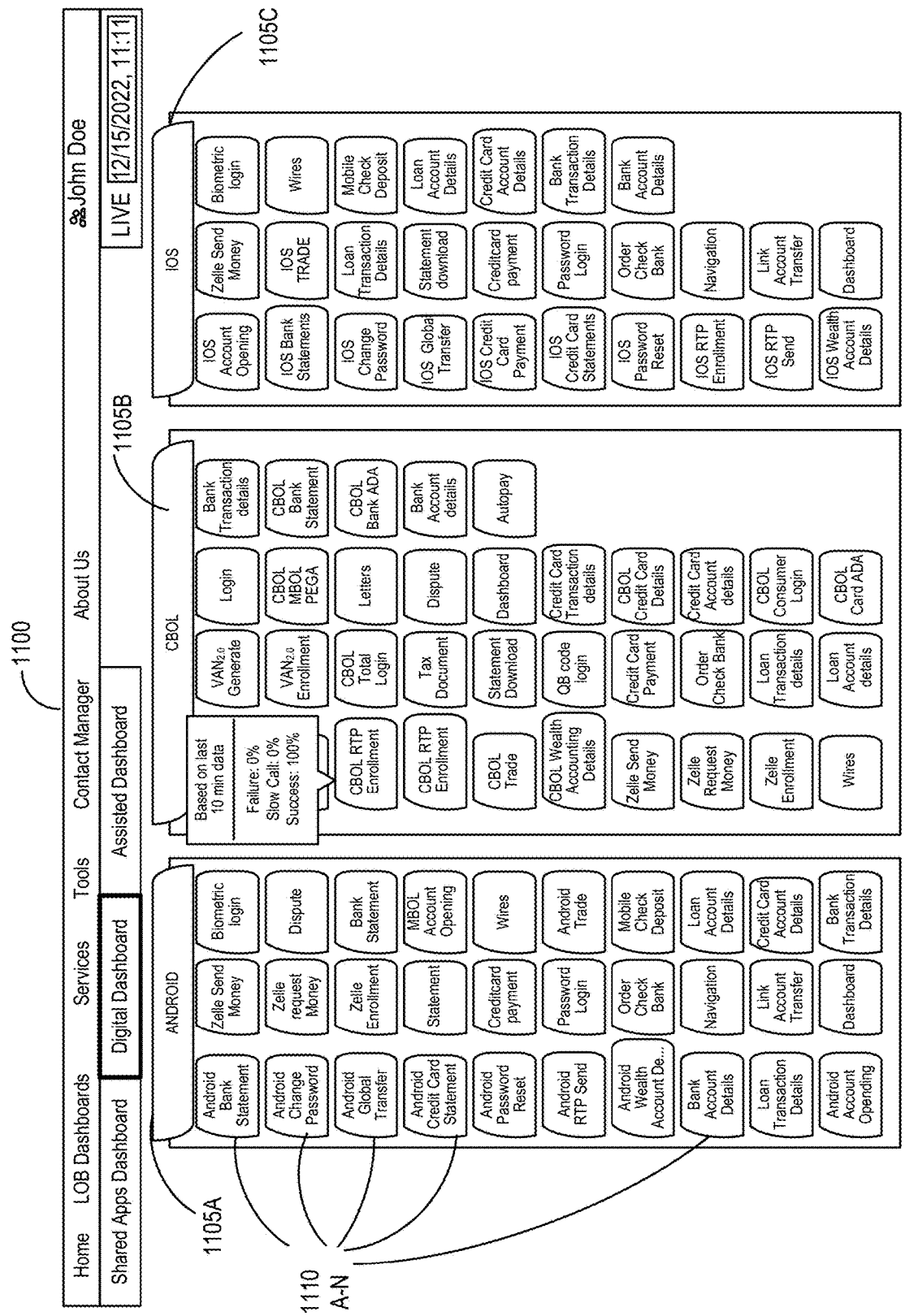
FIG. 11 depicts a screenshot of a performance indicator interface in the dashboard user interface for the system for performance analytics in accordance with an illustrative embodiment.

FIG. 11 depicts a screenshot of a performance indicator interface 1100 in the dashboard user interface for the system for performance analytics. The performance indicator interface 1100 may present performance indicators for various functions across multiple applications. In the depicted example, generally in the middle, the performance indicator interface 1100 may a set of lists 1102-C for each application platform (or operating systems). For each platform, the performance indicator interface 1100 may a set of functions 1110A-N identifying performance indicators (e.g., using color code indications). The performance indicator interface 1100 may be used by the network administrator to pinpoint certain functions (or transactions) as a cause of issues in a given application.

Figure 12:
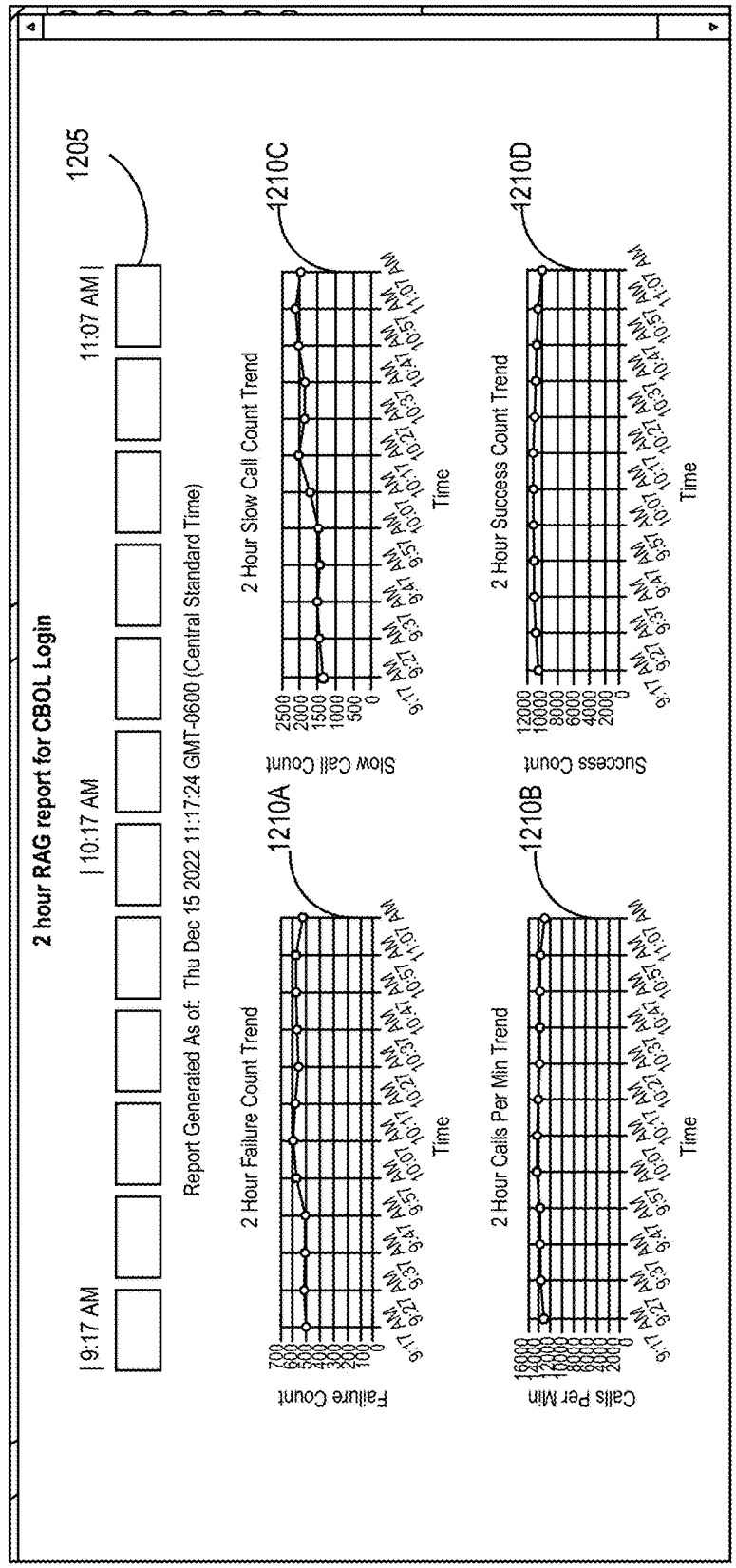
FIG. 12 depicts a screenshot of a drill down interface in the dashboard user interface for the system for performance analytics in accordance with an illustrative embodiment.

FIG. 12 depicts a screenshot of a drill down interface 1200 in the dashboard user interface for the system for performance analytics. The drill down interface 1200 may present additional metrics for a given function of a particular application. In the depicted example, along the top, the drill down interface 1200 may include an indicator element 1205 identifying performance indicators (e.g., using color code) for the identified function over a given time interval. In addition, generally in the middle, the drill down interface 1200 may include a set of graph elements 1210A-D identifying performance metrics (e.g., failure count trends, slow call count trend, calls per minute, and success count trend) over time. The drill down interface 1200 may be used by the network administrator to view various types of metrics for a particular function in a selected application.

Figure 13:
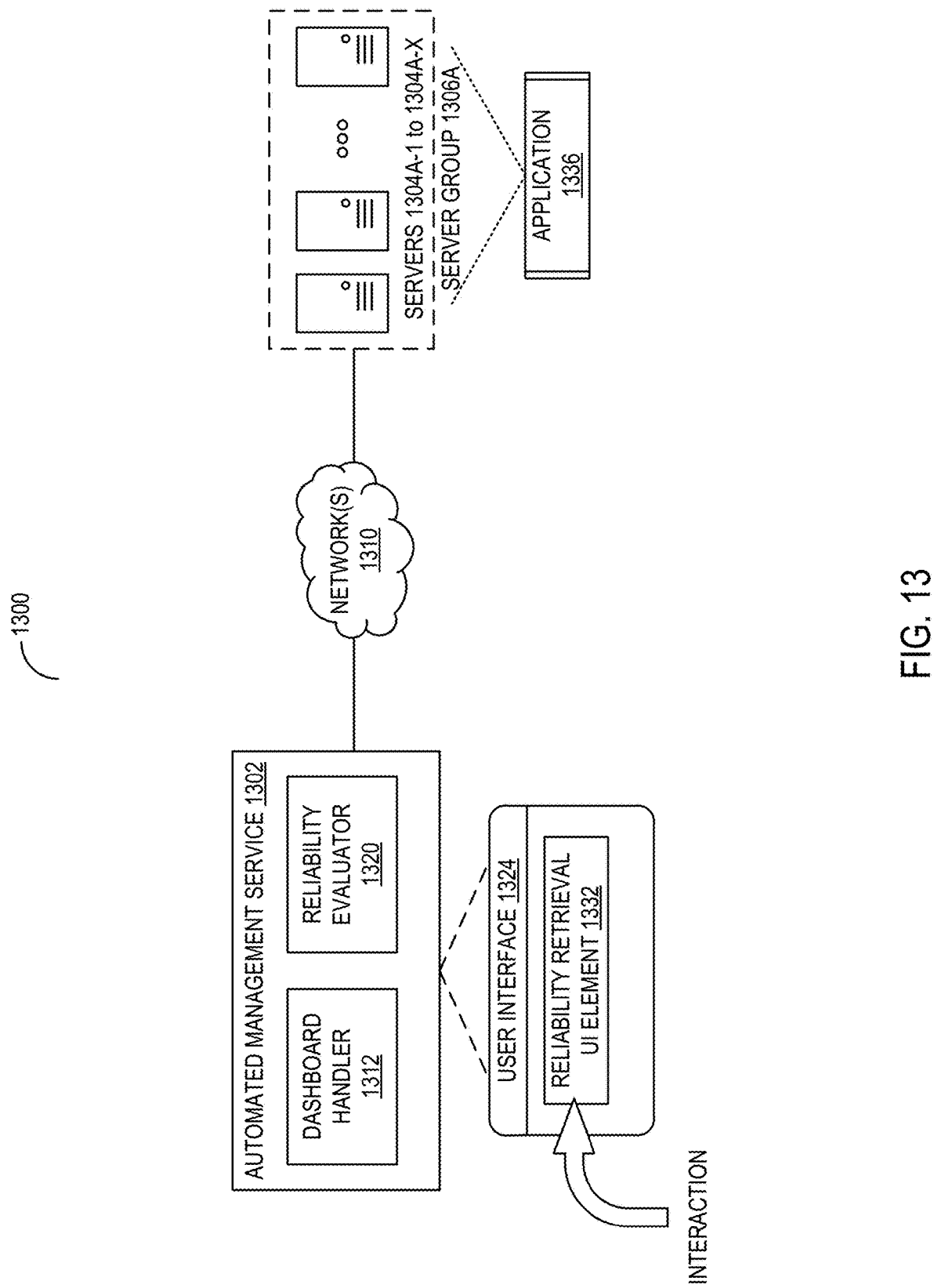
FIG. 13 depicts a block diagram of a system for site reliability evaluation in networked environments in accordance with an illustrative embodiment.

FIG. 13 depicts a block diagram of a system 1300 for site reliability evaluation in networked environments. The system 1300 may include at least one automated management service 1302, one or more servers 1304A-X (hereinafter generally referred to as servers 1304) in at least one server group 1306, and at least one database 1308, among others, communicatively coupled with one another via at least one network 1310. The automated management service 1302 may include at least one dashboard handler 1312 and at least one reliability evaluator 1320, among others, and may provide at least one user interface 1322. The user interface 1324 may include at least one analytics retrieval UI element 1332, among others. At least one of the servers 1304 in at least one server group 1306 may host resources for at least one application 1336. Embodiments may comprise additional or alternative components or omit certain components from those of FIG. 13, and still fall within the scope of this disclosure.

The dashboard handler 1312 executing on the automated management service 1302 may provide the user interface 1324 including the reliability retrieval UI element 1332. The reliability retrieval UI element 1332 may be rendered, displayed, or otherwise presented on at least one display of the automated management service 1302 or communicatively coupled with the automated management service 1302. The reliability retrieval UI element 1332 may correspond to at least one graphical user interface (GUI) element within the user interface 1324, such as a command button, a slider, a toggle switch, an image, a window, a prompt, or a container, among others, or any combination thereof. The reliability retrieval UI element 1332 may provide reliability indicators for the application 1036, the servers 1304, or the server group 1306. In response to detecting an interaction with the reliability retrieval UI element 1332, the dashboard handler 1312 may call, invoke, or otherwise execute the reliability evaluator 1320.

The reliability evaluator 1320 executing on the automated management service 1302 may calculate, identify, or determine a set of reliability measures for the application 1036, the servers 1304, or the server group 1306. The reliability evaluator 1320 may retrieve, obtain, or otherwise identify historical data instrumenting the application 1036, the servers 1304, or the server group 1306 from the database 1308. In conjunction, the reliability evaluator 1320 may retrieve, obtain, or otherwise identify one or more service level objectives (SLOs) for the application 1036, the servers 1304, or the server group 1306. With the identification, the reliability evaluator 1320 may compare the historical data with the SLOs. Based on the determination, the reliability evaluator 1320 may determine the reliability measures. With the determination, the reliability evaluator 1320 may provide the reliability indicators for presentation on the user interface 1324, in the manner depicted in FIGS. 14-17.

Figure 16:
FIG. 16 depicts a screenshot of a drill down interface in the dashboard user interface for the system for site reliability evaluation in accordance with an illustrative embodiment.
Figure 17:
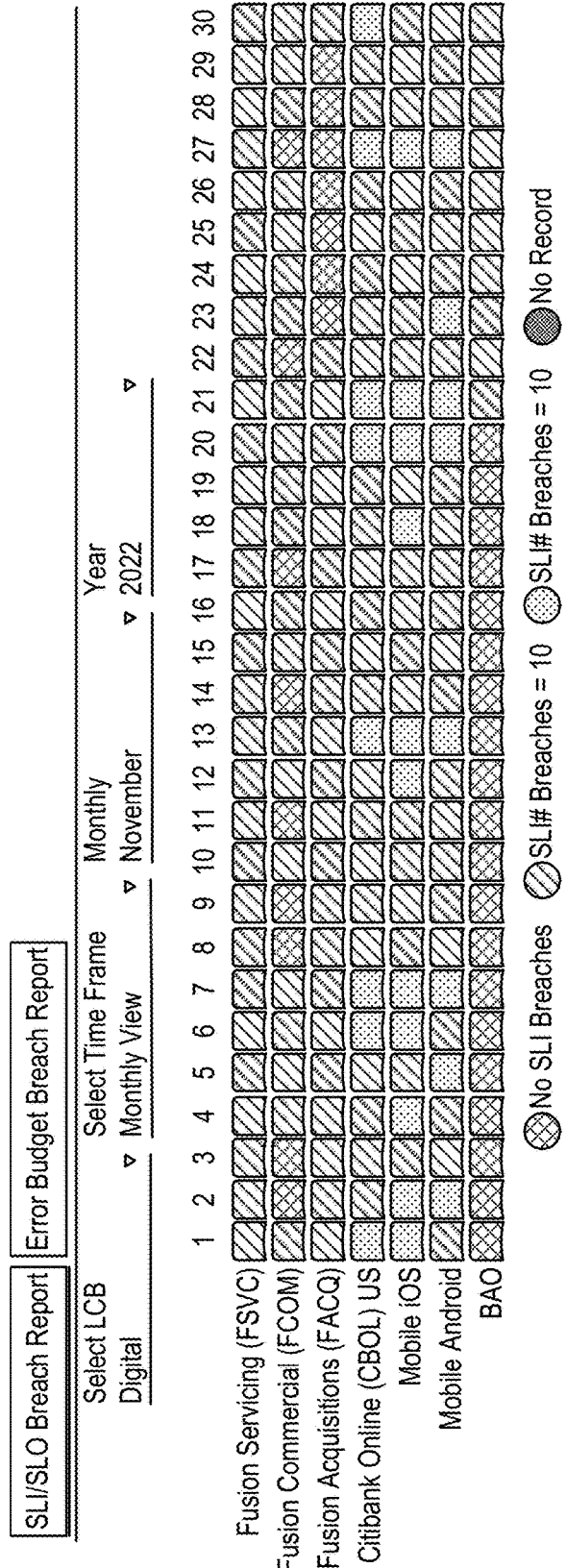
FIG. 17 depicts a screenshot of a heat map interface in the dashboard user interface for the system for site reliability evaluation in accordance with an illustrative embodiment.

FIG. 14 depicts a screenshot of an on-boarding interface 1400 in the dashboard user interface for the system for site reliability evaluation. The on-boarding interface 1400 may be a graphical user interface used to enter various parameters for SLOs. FIG. 15 depicts a screenshot of a reliability indication interface 1500 in the dashboard user interface for the system for site reliability evaluation. The reliability indication interface 1500 may present various statistics relevant to whether the SLOs are being met. FIG. 16 depicts a screenshot of a drill down interface 1600 in the dashboard user interface for the system for site reliability evaluation. The drill down interface 1600 may provide additional relevant statistics for a particular application, servers, or server groups. FIG. 17 depicts a screenshot of a heat map interface 1700 in the dashboard user interface for the system for site reliability evaluation. The heat map interface 1700 may present a set of reliability indicators for particular applications or platforms over multiple time intervals.

Figure 18:
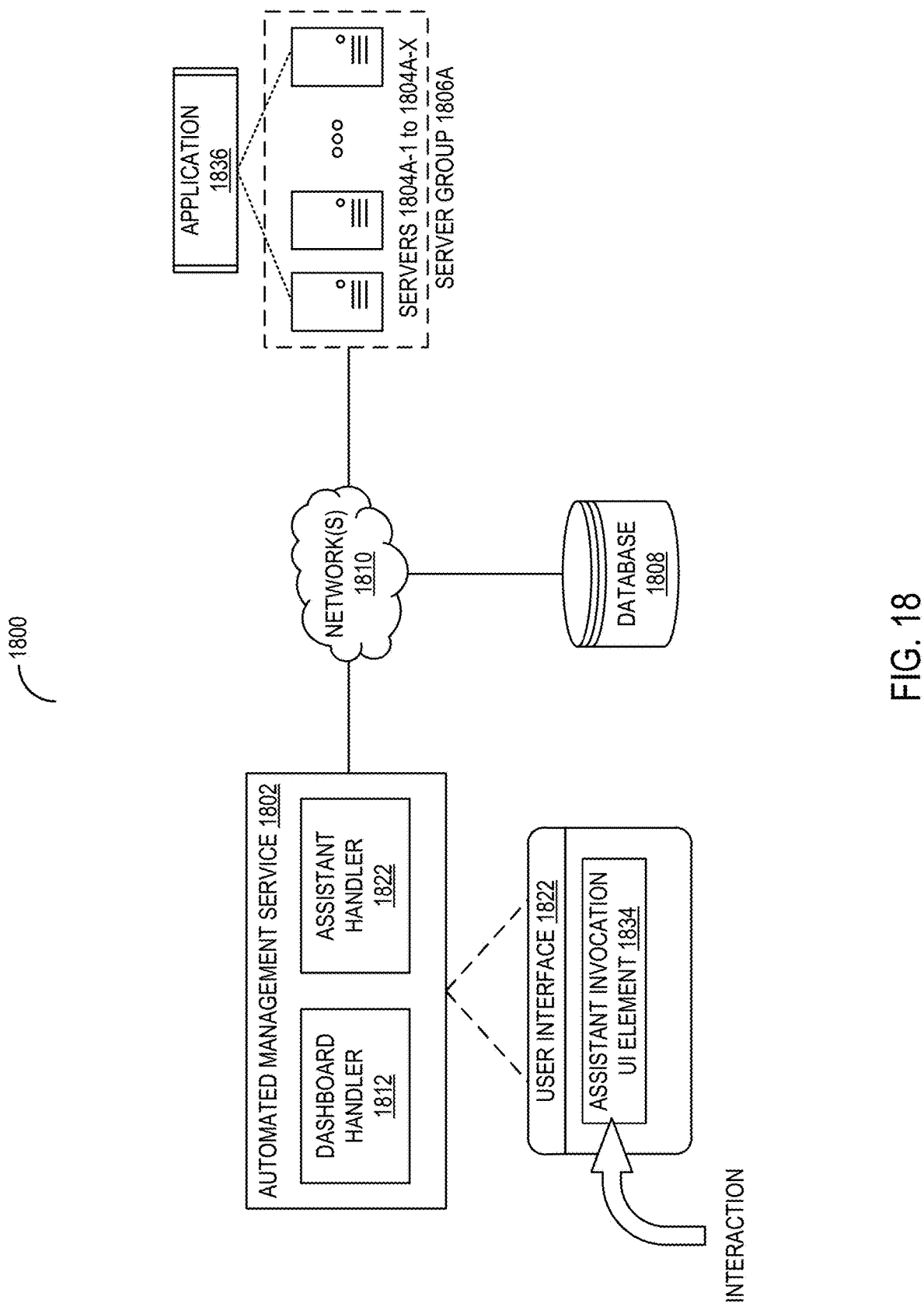
FIG. 18 depicts a block diagram of a system for services assistance in a system for managing networked environments in accordance with an illustrative embodiment.

FIG. 18 depicts a block diagram of a system 1800 for services assistance in a system for managing networked environments. The system 1800 may include at least one automated management service 1802, one or more servers 1804A-X (hereinafter generally referred to as servers 1804) in at least one server group 1806, and at least one database 1808, among others, communicatively coupled with one another via at least one network 1810. The automated management service 1802 may include at least one dashboard handler 1812 and at least one assistant handler 1822, among others, and may provide at least one user interface 1824. The user interface 1824 may include at least one assistant invocation UI element 1834, among others. At least one of the servers 1804 in at least one server group 1806 may host resources for at least one application 1836. Embodiments may comprise additional or alternative components or omit certain components from those of FIG. 18, and still fall within the scope of this disclosure.

The dashboard handler 1812 executing on the automated management service 1802 may provide the user interface 1824 including the assistant invocation UI element 1834. The assistant invocation UI element 1834 may be rendered, displayed, or otherwise presented on at least one display of the automated management service 1002 or communicatively coupled with the automated management service 1802. The assistant invocation UI element 1834 may correspond to at least one graphical user interface (GUI) element within the user interface 1824, such as a command button, a slider, a toggle switch, an image, a window, a prompt, or a container, among others, or any combination thereof. The assistant invocation UI element 1834 may provide an interface to a customer agent service to obtain health checks or enter incidents for the application 1836, the servers 1804, or the server group 1806. In response to detecting an interaction with the assistant invocation UI element 1834, the dashboard handler 1812 may call, invoke, or otherwise execute the assistant handler 1822.

The assistant handler 1822 executing on the automated management service 1802 may retrieve, obtain, or identify a health status of the application 1836, the servers 1804, or the server group 1806 selected via the user interface 1822. The assistant handler 1822 may invoke a customer services agent (e.g., a digital assistant application) to retrieve the health status of the indicated the application 1836, the servers 1804, or the server group 1806. The assistant handler 1822 may also provide invoke the customer services agent to enter details regarding an incident (e.g., an outage or an interruption) of the application 1836, the servers 1804, or the server group 1806. The customer services agent may handle incident ticketing to prevent duplicates or aggregate similar incidents. The input and output interfaces for the customer service agent may be presented in the interface 1822 in the manner depicted in FIGS. 19 and 20.

Figure 20:
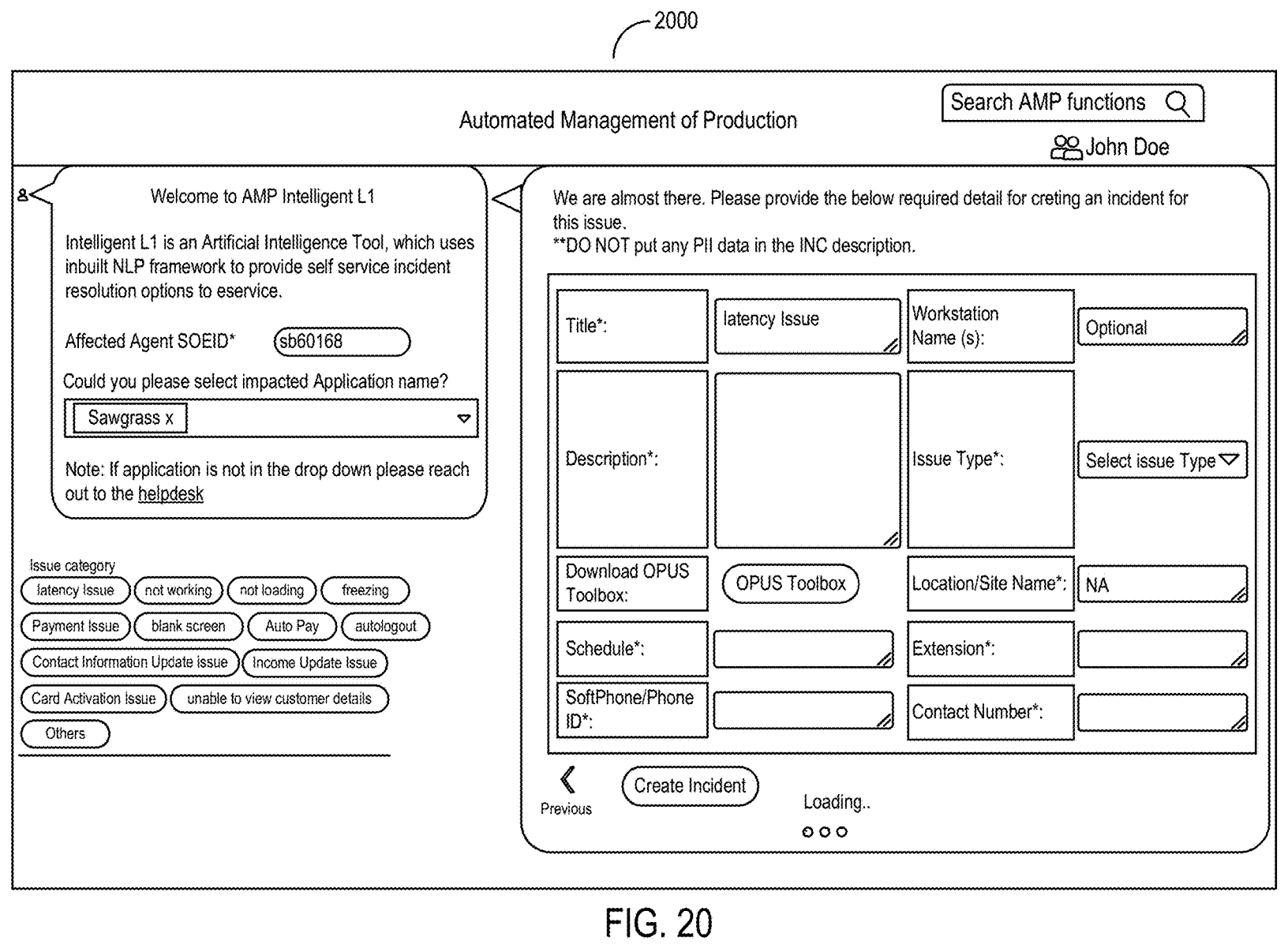

FIG. 19 depicts a screenshot of a health check interface 1900 in the dashboard user interface for the system for services assistance. In the depicted example, the health check interface 1900 may present a health status of various functions of an application. The health check interface 1900 may be also used to enter an impacted application to report incidents. FIG. 20 depicts a screenshot of a query interface 2000 in the dashboard user interface for the system for services assistance. In the depicted example, the query interface 2000 may enter additional information for the incident. The query interface 2000 may be used to submit incident reports to the customer service agent.

Figure 21:
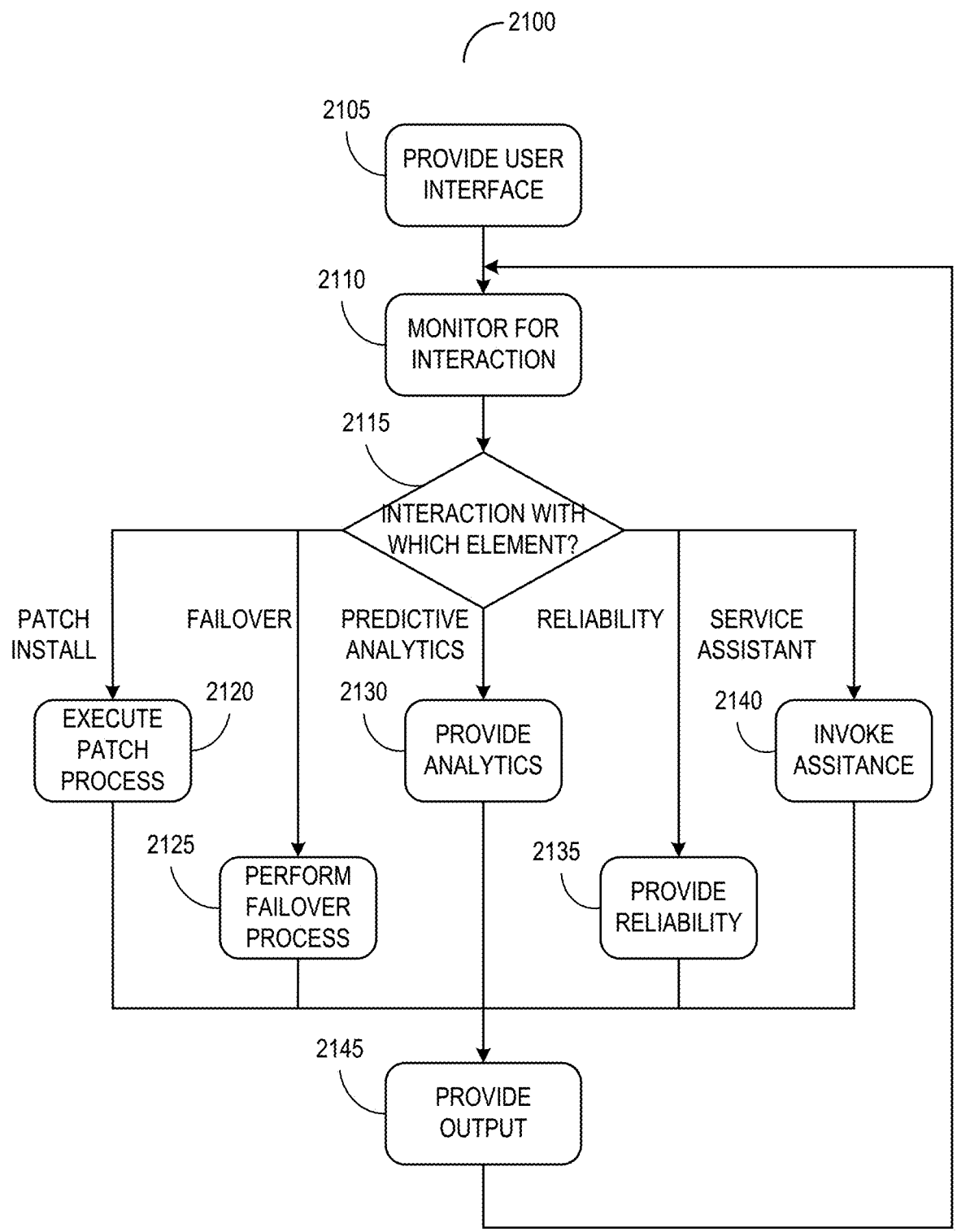
FIG. 21 depicts a flow diagram of a method of managing networked environments in accordance with an illustrative embodiment.

FIG. 21 depicts a flow diagram of a method of managing networked environments. Embodiments may include additional, fewer, or different operations from those described in the method 2100. The method 2100 may be performed by a service (e.g., an automated management service) executing machine-readable software code, though it should be appreciated that the various operations may be performed by one or more computing devices and/or processors. At step 2105, the service may provide a dashboard user interface. The dashboard user interface may include a first element to invoke patch management, a second element to execute traffic failover, a third element to retrieve predictive analytics, a fourth element to provide reliability indications, and a fifth element to invoke a services assistant.

At step 2110, the service may monitor for an interaction with one of the elements of the dashboard user interface. At step 2115, if the interaction is detected on the dashboard user interface the service may determine which process to invoke. At step 2120, if the interaction is with the first element, the service may execute the patch process to shut down a server group, install the patch, and perform validation. At step 2125, if the interaction is with the second element, the service may perform a failover process to transfer network traffic for an identifier application from one group of servers to another group of services.

In addition, at step 2130, if the interaction is with the third element, the service may provide analytics by generating performance indicators for functions of the application. At step 2135, if the interaction is with the fourth element, the service may provide reliability indicators in accordance with service level objections (SLOs). At step 2140, if the interaction is with the fifth element, the service may invoke the customer services agent to check health statuses of applications and managing ticketing of incidents. At step 2145, the service may provide the output from the performed process on the dashboard user interface. Subsequently, the service may repeat the method 2100 from the step 2110.

Figure 22:
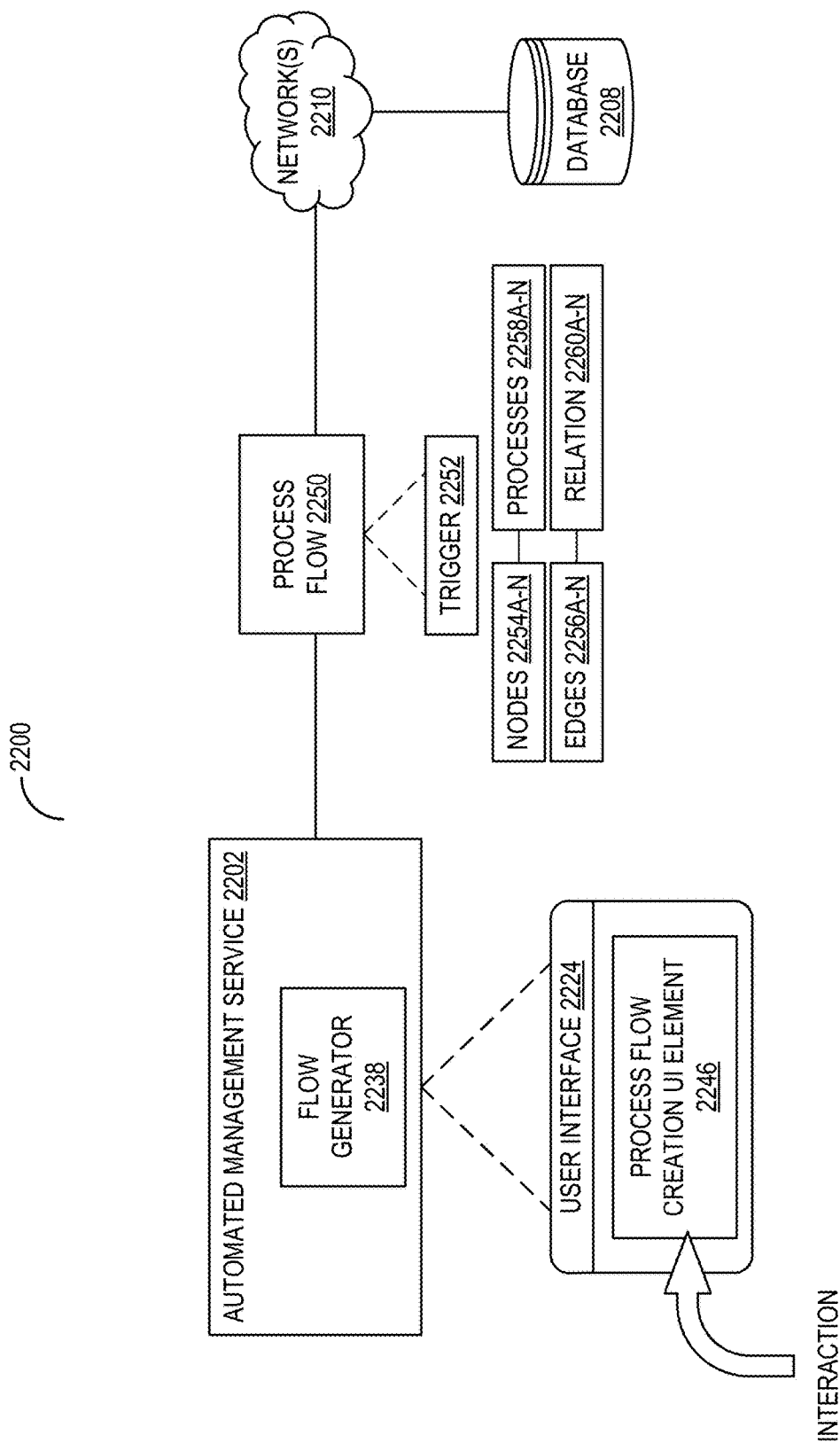
FIG. 22 depicts a block diagram of a system for generating process flows for managing networked environment in accordance with an illustrative embodiment.

FIG. 22 depicts a block diagram of a system 2200 for generating process flows for managing networked environment. The system 2200 may include at least one automated management service 2202 and at least one database 2208, among others, communicatively coupled with one another via at least one network 2210. The automated management service 1802 may include at least one flow generator 2238, among others, and may provide at least one user interface 2224. The user interface 2224 may include at least one process flow creation UI element 2246, among others. Embodiments may comprise additional or alternative components or omit certain components from those of FIG. 22, and still fall within the scope of this disclosure.

The flow generator 2238 executing on the automated management service 2202 may provide or present the user interface 2224 including the process flow creation UI element 2246. The process flow creation UI element 2246 may be rendered, displayed, or otherwise presented on at least one display of the automated management service 1002 or communicatively coupled with the automated management service 1802. The process flow creation UI element 2246 may correspond to at least one graphical user interface (GUI) element within the user interface 1824, such as a command button, a slider, a toggle switch, an image, a window, a prompt, or a container, among others, or any combination thereof. The process flow creation UI element 2246 may include one or more user interface elements to define process flows to be executed on services. In response to detecting an interaction with the process flow creation UI element 2246, the automated management service 2202 may call, invoke, or otherwise execute the flow generator 2238. The user interface for the process flow creation UI element 2246 may be in the manner depicted in FIGS. 23A and 23B.

Using the interactions with the process flow creation UI element 2246, the flow generator 2238 may create, produce, or otherwise generate at least one process flow 2250. The process flow 2250 may be to manage a set of services (or a group of servers) in a networked environment. The process flow 2250 may identify or include at least one trigger 2252, a set of nodes 2254A-N (hereinafter generally referred to as a set of nodes 2254), and a set of edges 2256A-N (hereinafter generally referred to as a set of edges 2256), among others. The trigger 2252 may define at least one condition under which the process flow 2250 is to be invoked to initiate at least one process of the process flow 2250. The condition may correspond to or include, for example, an occurrence of an event (e.g., an anomaly, failure, spike in network traffic, or update to services) in the network, a scheduled time (e.g., at a single time instance or an interval) to execute, a manual execution (e.g., one-touch activation) of the process flow 2250, or a completion of execution of another process flow, among others.

In the process flow 2250, the set of nodes 2254 may define, identify, or otherwise correspond to a set of processes 2258A-N (hereinafter generally referred to as process 2258, sometimes herein referred to as tasks) to be performed in executing the process flow 2250. Each process 2258 may include one or more operations to be performed in carrying out the process flow 2250. Each node 2254 may identify or include a respective definition to a respective process 2258 for the set of processes 2258. The definition may identify or include, for example: a set of attributes (e.g., a name, a node type, a process type, application identifier, a service to execute the process, an external service or application programming interface (API) to be invoked, or an objective of the process), a script (e.g., computer-readable instructions inputted by a network administrator) to be executed as at least a portion of the process 2258, and a metadata (e.g., access controls based on role of user), among others.

In addition, each edge 2256 may define, specify, or otherwise identify at least one relationship 2260A-N (hereinafter generally referred to as relationship 2260) between at least two nodes 2254 in the set of nodes 2254. The relationship may include or identify a conditional logic between the processes 2258 corresponding to the two nodes 2254. In some embodiments, the relationship of the edge 2256 may specify or identify that a process 2258 corresponding to a second node 2254 is to be executed, in response to completion of another process 2258 corresponding to a first node 2254. In some embodiments, the relationship may include or identify a parallel execution of the processes 2258 corresponding to the nodes 2254. For example, the edge 2256 may specify or identify that two processes 2258 corresponding to the two nodes 2254 are to be executed in parallel. Each node 2254 in the set of nodes 2254 may have at least one edge 2256 with another edge 2256 in the set of nodes 2254 in the process flow 2250.

To generate the process flow 2250, the flow generator 2238 may obtain, accept, or otherwise receive one or more interactions with the user interface elements of the process flow creation UI element 2246. The interactions may be used to form or specify a flow definition for the process flow 2250. The interactions may include, for example, clicking, tapping, drag-and-dropping, keypress, mouse scrolls, among others. At least one of the user interface elements of the process flow creation UI element 2246 may be to insert, include, or otherwise add nodes 2254 corresponding to processes 2258 to be executed on the services in the network, in response to user interaction on the user interface element. At least one of the user interface elements of the process flow creation UI element 2246 may be to insert, include, or otherwise add edges 2256 corresponding to relationships 2260 among the nodes 2254 corresponding to the processes, in response to user interaction on the user interface element. The edges 2256 may correspond to relationships 2260 (e.g., conditional logic or parallel execution) among the processes of the nodes 2254.

In some embodiments, the process flow creation UI element 2246 may include other user interface elements. At least one user interface element of the process flow creation UI element 2246 may correspond to or include a region. The region may correspond to an area on the process flow creation UI element 2246 to display, render, or otherwise present objects corresponding to the nodes 2254 and the edges 2258. The region may include objects (e.g., in the form of geometric shapes) corresponding to the nodes 2254 added in response to a corresponding user interaction. The region may also include objects (e.g., in the form of lines) corresponding to edges 2256 added in response to a corresponding user interaction. At least one user interface element to retrieve, add, or include a template. The template may include predefined nodes 2254 and edges 2256 forming at least a portion of the process flow 2250. Other user interface elements may include at least one element to save the current version of the process flow 2250 and at least one element to restore a prior version of the process flow 2250.

From the user interactions with the process flow creation UI element 2246, the flow generator 2238 may retrieve, identify, or receive the flow definition for the process flow 2250. The definition may identify or include the trigger 2252, the set of nodes 2254 corresponding to the processes 2258, and the set of edges 2256 corresponding not the relationships 2260. According to the flow definition, the flow generator 2238 may create, produce, or otherwise generate the process flow 2250. In generating the process flow 2250, the flow generator 2238 may create or write one or more files corresponding not or defining the process flow 2250. In some embodiments, the flow generator 2238 may change, update, or otherwise modify the process flow 2250 using the interactions with the process flow creation UI element 2246. For example, the network administrator may use the process flow creation UI element 2246 to open and edit a pre-existing process flow 2250.

With the generation of the process flow 2250, the flow generator 2238 may save or store the process flow 2250 on the database 2208. The flow generator 2238 may maintain a set of process flows 2250 to manage services within the networked environment. In some embodiments, the flow generator 2238 may store the one or more files corresponding to the process flow 2250 on the database 2208. In some embodiments, the flow generator 2238 may load the process flow 2250 on the automated management service 2202. Upon loading, the automated management service 2202 may monitor for triggers in the network environment and manage execution of the process flows 2250 on the services within the network. In some embodiments, the automated management service 2202 may load the process flows 2250 to instantiate as another component on the automated management service 2202, such as a patch manager, a failover manager, an analytics evaluator, a reliability evaluator, a reliability evaluator, an assistant handler, an anomaly handler, and a certificate manager, among others.

Figure 23A:
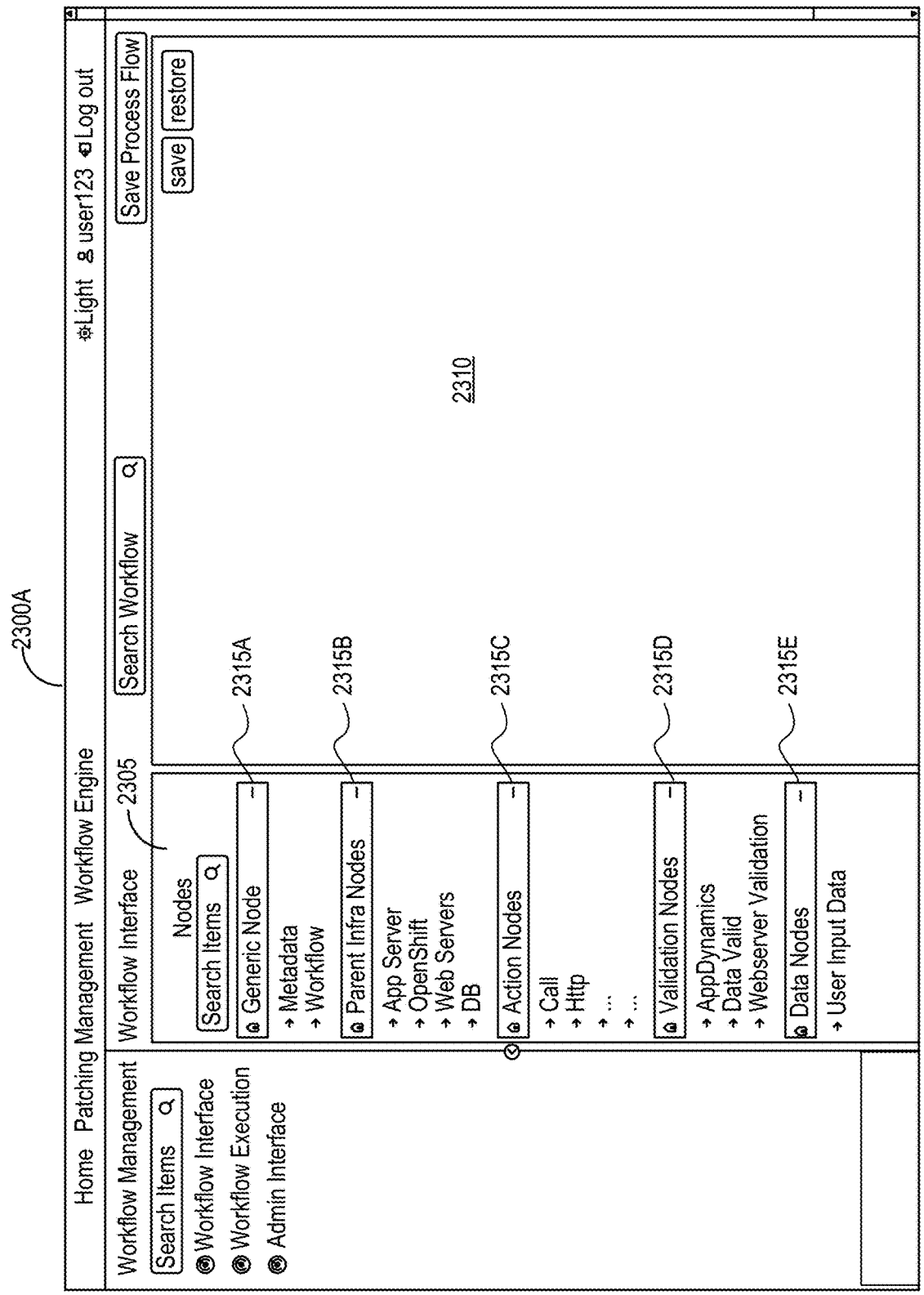
FIGS. 23A and 23B each depicts a screenshot of a user interface for defining process flows in the system for generating process flows in accordance with an illustrative embodiment.
Figure 23B:
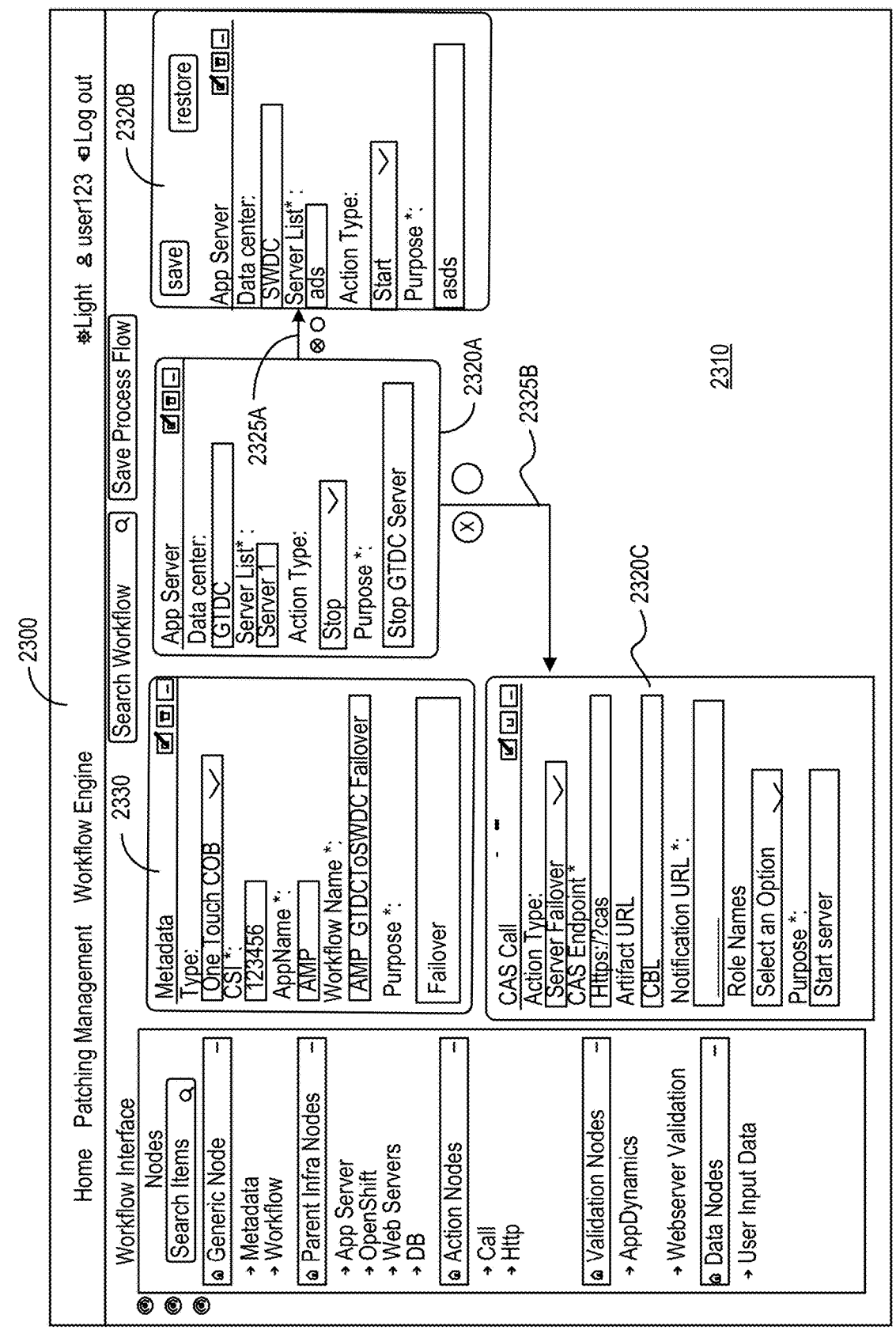

FIGS. 23A and 23B each depicts a screenshot of a user interface 2300 for defining process flows in the system for generating process flows. Referring to FIG. 23A, the user interface 2300 may include at least one tool panel 2305 and at least one flow region 2310. The tool panel 2305 may include one or more user interface elements 2315A-E (hereinafter generally referred to as user interface elements 2315) to insert or add nodes corresponding to processes within a given process flow. Referring to FIG. 23B, with the user interactions with user interface elements 2315 of the panel 2305, the user interface 2300 may add one or more node objects 2320A-C (hereinafter generally referred to as node objects 2320) within the flow region 2310. With additional user interactions, the user interface 2300 may add one or more edge objects 2325A and 2325B (hereinafter generally referred to as edge objects 2325) connecting respective pairs of node objects 2320. In the depicted example, the process flow may be defined to have three nodes corresponding to the node objects 2320A-C with branches defined by the edges corresponding to the edge objects 2325A and 2325B.

The user interface 2300 may also add at least one metadata object 2330 to define metadata and other information (e.g., including trigger conditions) for the process flow.

Figure 24:
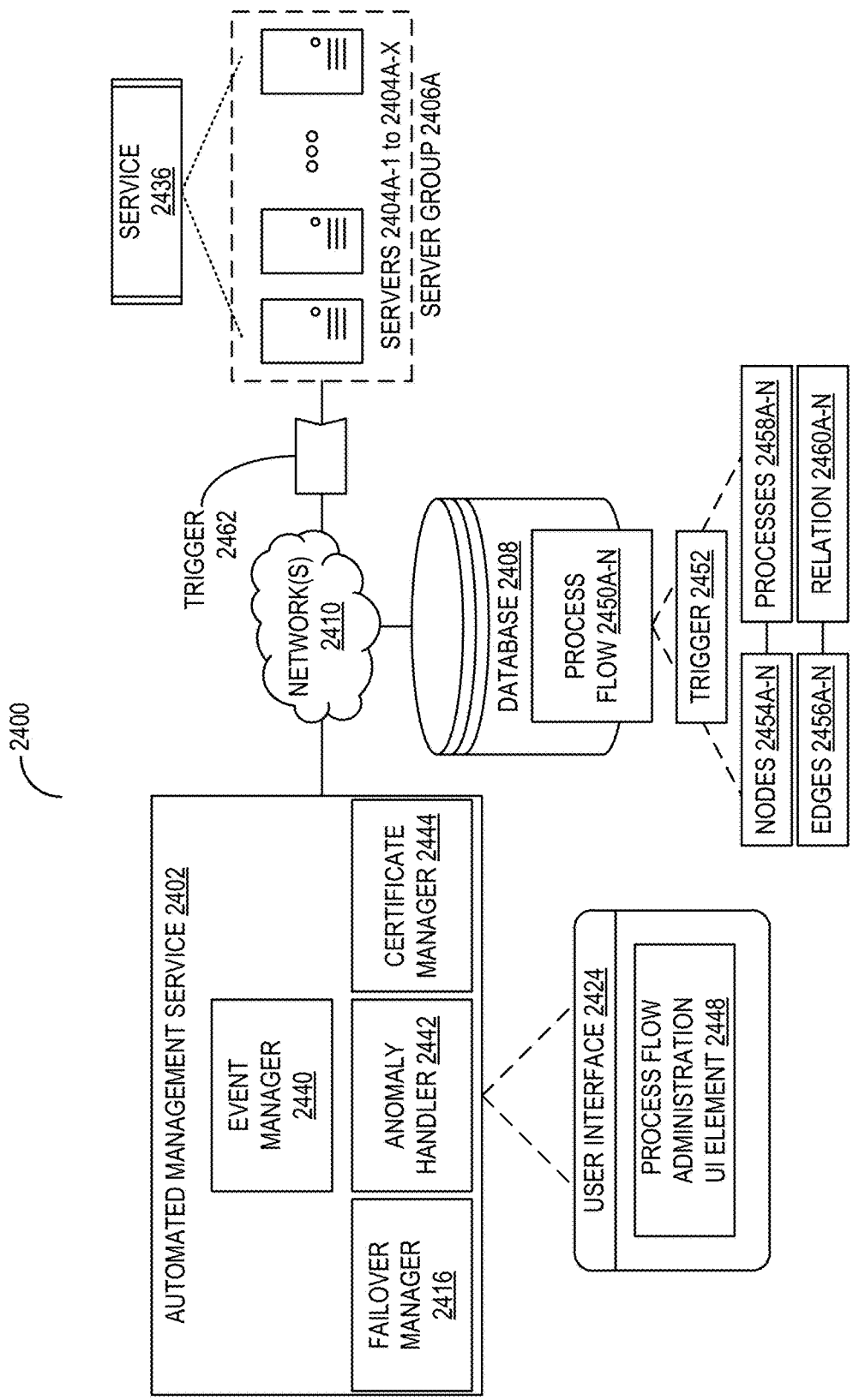
FIG. 24 depicts a block diagram of a system for executing process flows for managing networked environment in accordance with an illustrative embodiment.

FIG. 24 depicts a block diagram of a system 2400 for executing process flows for managing networked environment. The system 2400 may include at least one automated management service 2402, one or more servers 2404A-X (hereinafter generally referred to as servers 2404) in at least one server group 2406, and at least one database 2408, among others, communicatively coupled with one another via at least one network 2410. The automated management service 2402 may include at least one event manager 2440, at least one failover manager 2416, at least one anomaly handler 2442, and at least one certificate manager 2444, among others, and may provide at least one user interface element 2424. The user interface 2424 may include at least one process flow administration UI element 2448, among others. At least one of the servers 2404 in at least one server group 2406 may host resources for at least one service 2436 (sometimes herein referred to as an application). Embodiments may comprise additional or alternative components or omit certain components from those of FIG. 24, and still fall within the scope of this disclosure.

The event manager 2440 executing the automated management service 2402 may maintain a set of process flows 2450A-N (hereinafter generally referred to as process flows 2450). Each process flow 2450 may identify or include at least one trigger 2252, a set of nodes 2254A-N (hereinafter generally referred to as a set of nodes 2454), and a set of edges 2456A-N (hereinafter generally referred to as a set of edges 2456), among others. The trigger 2452 may define at least one condition under which the process flow 2450 is to be invoked to initiate at least one process of the process flow 2250. The set of nodes 2454 may define, identify, or otherwise correspond to a set of processes 2458A-N (hereinafter generally referred to as process 2458, sometimes herein referred to as tasks) to be performed in executing the process flow 2450. Each edge 2456 may define, specify, or otherwise identify at least one relationship 2460A-N (hereinafter generally referred to as relationship 2460) between at least two nodes 2454 in the set of nodes 2454. The relationship may include or identify a conditional logic between the processes 2458 corresponding to the two nodes 2454. The one or more files corresponding to the process flows 2450 may be stored and maintained on the database 2408.

The event manager 2440 may monitor or check for at least one trigger 2462 associated with at least one of the process flows 2450. In some embodiments, the event manager 2440 may monitor for the trigger 2462 within the networked environment, such as the servers 2404, the server group 2406, the service 2436, or network 2410, among others, as defined by the trigger of the process flow 2450. The trigger 2462 may for example, correspond to or include an occurrence of an event, such as an anomaly, failure, spike in network traffic, or update to services, among others. When the occurrence of the event specified by the process flow 2450 is detected, the event manager 2440 may detect the trigger 2462. Otherwise, when the occurrence of the event is not detected, the event manager 2440 may continue to monitor for the trigger 2462 within the networked environment.

In some embodiments, the event manager 2440 may check for the trigger 2462 from each process flow 2450. The trigger 2462 may correspond to or include, for example, a manual execution of the process flow 2450 (e.g., via one-touch activation on the user interface 2424) or a scheduled time as specified by the process flow 2450. When the manual activation or the specified time specified by the process flow 2450 is detected, the event manager 2440 may detect the trigger 2462. Otherwise, the event manager 2440 may continue to monitor for the trigger 2462. In some embodiments, the event manager 2440 may monitor for the trigger 2462 from the execution of process flows 2450. For instance, the trigger 2462 may specify that the respective process flow 2450 is to be executed, upon completion of execution of another process flow 2450. If the completion of execution of the other process flow 2450 is detected, the event manager 2440 may detect the trigger 2462. Otherwise, the event manager 2440 may continue to monitor for the trigger 2462. The event manager 2440 may perform the monitoring across the set of process flow 2450 maintained by the automated management service 2402.

With the detection of the trigger 2462, the event manager 2440 may identify or select the process flow 2450 from the set of process flows 2450 based on the trigger 2462. The event manager 2440 may select the process flow 2450 with the trigger condition corresponding to the detected trigger 2462. In some embodiments, the event manager 2440 may select multiple process flows 2450 from the overall set of process flows 2450 based on the trigger 2462. The event manager 2440 may execute the set of processes 2458 in accordance with the definition of the process flow 2450. In some embodiments, the event manager 2440 may execute at least one process 2458 on the service 2435 (or the servers 2404 or the server group 2406) in accordance with the definition of each process 2458 as specified in the corresponding node 2454 of the process flow 2450. In some embodiments, as the process flow 2450 is executed, the event manager 2440 may determine or identify a state of the execution of the process flow 2450. The state may correspond to the node 2454 associated with the process 2458. Upon identification, the event manager 2440 may execute or carry out the process 2458 corresponding to the node 2454 in accordance with the respective definition. The event manager 2440 may execute the set of processes 2458 by iteratively identifying each node 2456 in the process flow 2450.

When the trigger 2462 is detecting failure in a set of servers 2404, the event manager 2440 may select the process flow 2450 for the traffic failover process. The event manager 2440 may invoke the failover manager 2416 that implements process flow 2450 for the traffic failover process. When the trigger 2462 is detecting an anomaly (e.g., a sudden drop or spike in network traffic or performance) in a set of servers 2404 in the networked environment, the event manager 2440 may select the process flow 2450 for the anomaly detection flow. The event manager 2440 may invoke the anomaly manager 2442 that implements process flow 2450 for the anomaly detection process. When the trigger 2462 is detecting an expiration of a certificate for a service 2436 or at least one of the set of servers 2404 in the networked environment, the event manager 2440 may select the process flow 2450 for the certificate renewal flow. The event manager 2440 may invoke the certificate manager 2444 that implements process flow 2450 for the certificate renewal process.

Upon invocation, the failover manager 2416 executing on the automated management service 2402 may carry out, perform, or otherwise execute the set of processes 2458 in accordance with the process flow 2450 for the traffic failover process. The failover manager 2416 may execute a first process 2458 corresponding to the first node 2454 as identified by the trigger 2452 for the process flow 2450. The failover manager 2416 may execute the first process 2458 to find, select, or otherwise identify a first set of servers 2404 available to host resources for a second plurality of servers 2404 to provide the same service 2436. With the execution of the first process 2458, the failover manager 2416 may identify a second process 2458 corresponding to the second node 2454 to execute, as identified as having the relationship 2460 with the first node 2454 via the edge 2456. The failover manager 2416 may execute the second process 2458 to transfer network traffic of the service from the second set of servers 2404 to the first plurality of servers 2404.

Upon invocation, the anomaly handler 2442 executing on the automated management service 2402 may carry out, perform, or otherwise execute the set of processes 2458 in accordance with the process flow 2450 for the anomaly detection flow. The anomaly handler 2442 may execute a first process 2458 corresponding to the first node 2454 as identified by the trigger 2452 for the process flow 2450. The anomaly handler 2442 may execute the first process 2458 to identify or select a self-healing measure from a set of self-healing measures in response to the anomaly in the service 2436 or in the network environment. Each self-healing measure may be to address the type of detect anomaly. The set of self-healing measures may include, for example, restarting the affected service 2436, the servers 2404, or the server group 2406, among others.

With the execution of the first process 2458, the anomaly handler 2442 may identify a second process 2458 corresponding to the second node 2454 to execute, as identified as having the relationship 2460 with the first node 2454 via the edge 2456. The anomaly handler 2442 may execute the second process 2458 to carry out the identified self-healing measure. For example, the anomaly handler 2442 may shut down and initiate reboot of the affected service 2436. With the execution of the second process 2458, the anomaly handler 2442 may identify a third process 2458 corresponding to the third node 2454 to execute, as identified as having the relationship 2460 with the second node 2454 via a respective edge 2456. The anomaly handler 2442 may execute the third process 2458 to validate resolution of the anomaly on the affected service 2436, the servers 2404, or the server group 2406, among others in response to the self-healing measure. In some embodiments, the self-healing measure may include invoking a third-party service or an application programming interface (API) to check health of the affected service 2436, the servers 2404, or the server group 2406 to determine whether the self-healing measure was effective.

Upon invocation, the certificate manager 2444 executing on the automated management service 2402 may carry out, perform, or otherwise execute the set of processes 2458 in accordance with the process flow 2450 for the certificate renewal flow. The certificate manager 2444 may execute a first process 2458 corresponding to the first node 2454 as identified by the trigger 2452 for the process flow 2450. The certificate manager 2444 may execute the first process 2458 to request for renew an original certificate by generating a new certificate to provide to the service 2436 (or servers 2404 or server groups 2406), in response to the expiration. The original certificate may have been used by the service 2436, the servers 2404, or the server group 2406 to access resources. The request may be sent to a certificate issuance service (e.g., hosted on a first-party entity service or a third-party entity service). For example, the certificate manager 2444 may call the certificate issuance service via an application programming interface (API) call associated with the certificate issuance service. In some embodiments, the certificate manager 2444 may identify other services 2436, servers 2404, or server groups 2406 with certificates about to expire within a set time period (e.g., within 10 minutes to 30 days). The request may include an identification of the other services 2436, servers 2404, or server groups 2406.

With the execution of the first process 2458, the certificate manager 2444 may identify a second process 2458 corresponding to the second node 2454 to execute, as identified as having the relationship 2460 with the first node 2454 via the edge 2456. The certificate manager 2444 may execute the second process 2458 to retrieve, obtain, or otherwise receive the new certificate from the certificate issuance server and to forward, send, or otherwise provide the new certificate to affected service 2436 (or servers 2404 or server groups 2406). With the execution of the second process 2458, the anomaly handler 2442 may identify a third process 2458 corresponding to the third node 2454 to execute, as identified as having the relationship 2460 with the second node 2454 via a respective edge 2456. The anomaly handler 2442 may execute the third process 2458 to validate renewal of the certificate. To validate, the anomaly handler 2442 may check whether the affected service 2436 is granted and able to access resources using the newly issued certificate.

From executing at least one of the processes 2458 of the process flow 2450, the event manager 2440 may produce, create, or otherwise generate at least one output. The output may identify or indicate a status of execution of the process flow 2450 on the service 2436 (or the servers 2404 or the server group 2406) in the network. For example, the output may identify whether the process flow 2450 was successfully carried out or failure to execute to completion. The output may also include information associated with the execution of the process flow 2450, such as: an identifier of the process flow 2450; an identification of the service 2436, the servers 2404, the server group 2460; a geographic region of the service 2436, the servers 2404, the server group 2460; a time length of completion; and a time stamp corresponding to the completion, among others.

Figure 25A:
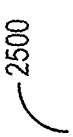

FIGS. 25A and 25B each depict a screenshot of an administration interface 2500 and 2505 for process flows in the system for executing process flows. The administration interface 2500 may include information regarding the execution of a process flow. The information may include, for example, an identification of the process flow, a version of the process flow, a region of the services upon which the process flow is executed, an environment in which the process flow is executed, and the completion of the process flow, among others. The administration interface 2505 may include information regarding the execution of a process flow. The information may include, for example, an identification of each respective process flow, a version of the process flow, a sector and a region of the services upon which the process flow is executed, a start and end date of the process flow, and an identification of the trigger, among others.

Figure 26A:
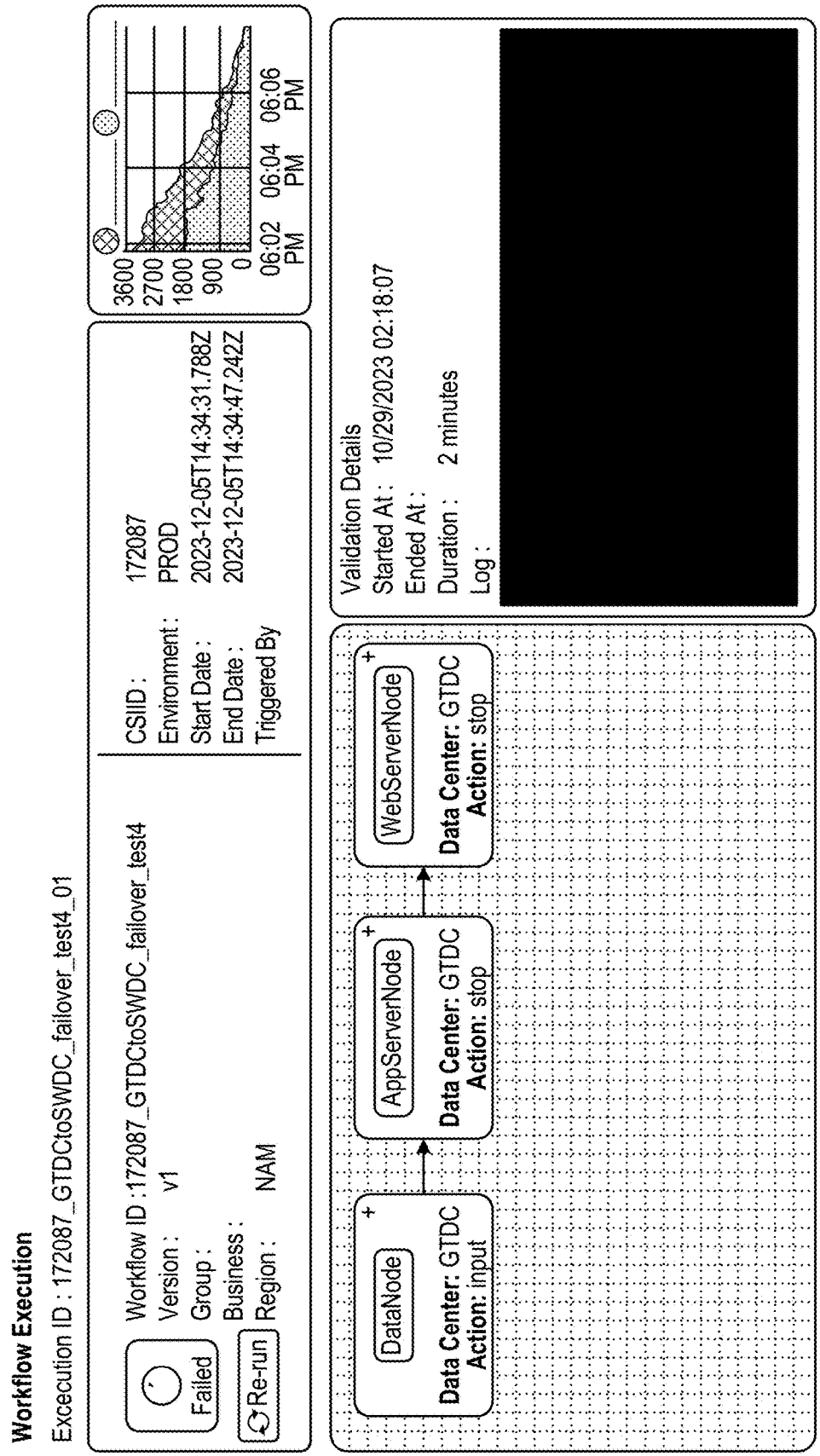
FIGS. 26A and 26B each depict a screenshot of an monitoring interface for process flows in the system for executing process flows, in accordance with an illustrative embodiment.
Figure 26B:
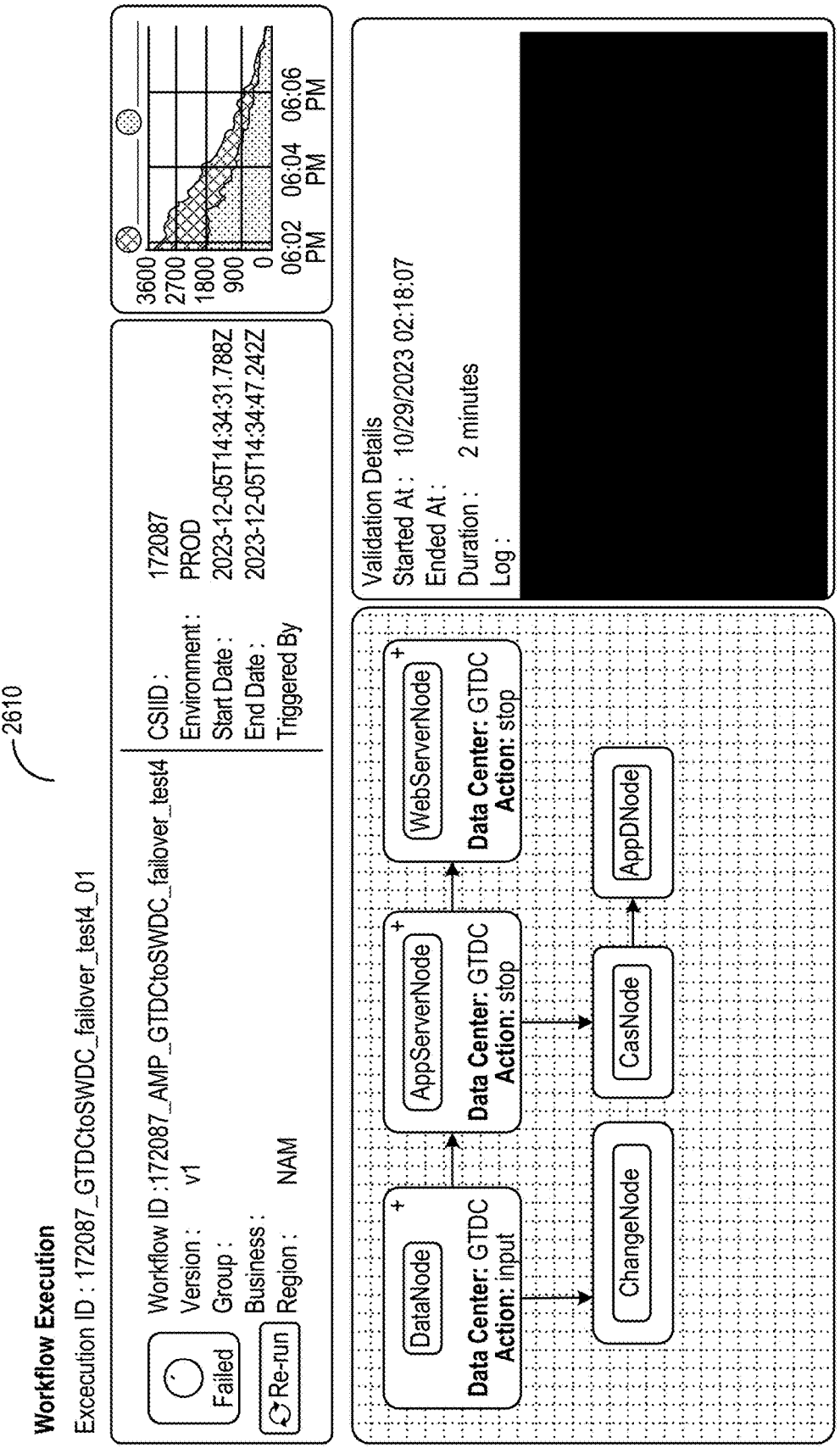

FIGS. 26A and 26B each depict a screenshot of a monitoring interface 2600 and 2605 for process flows in the system for executing process flows. Each of the monitoring interfaces 2600 may include information, such as an identifier of the process flow, a version of the process flow, a sector and a region of the services upon which the process flow is executed, a start and end date of the process flow, and an identification of the trigger, among others. The monitoring interface 2600 and 2605 may each further include a visualization of individual processes within the process flow. In addition, the monitoring interface 2605 may include information in visualized format.

Figure 27:
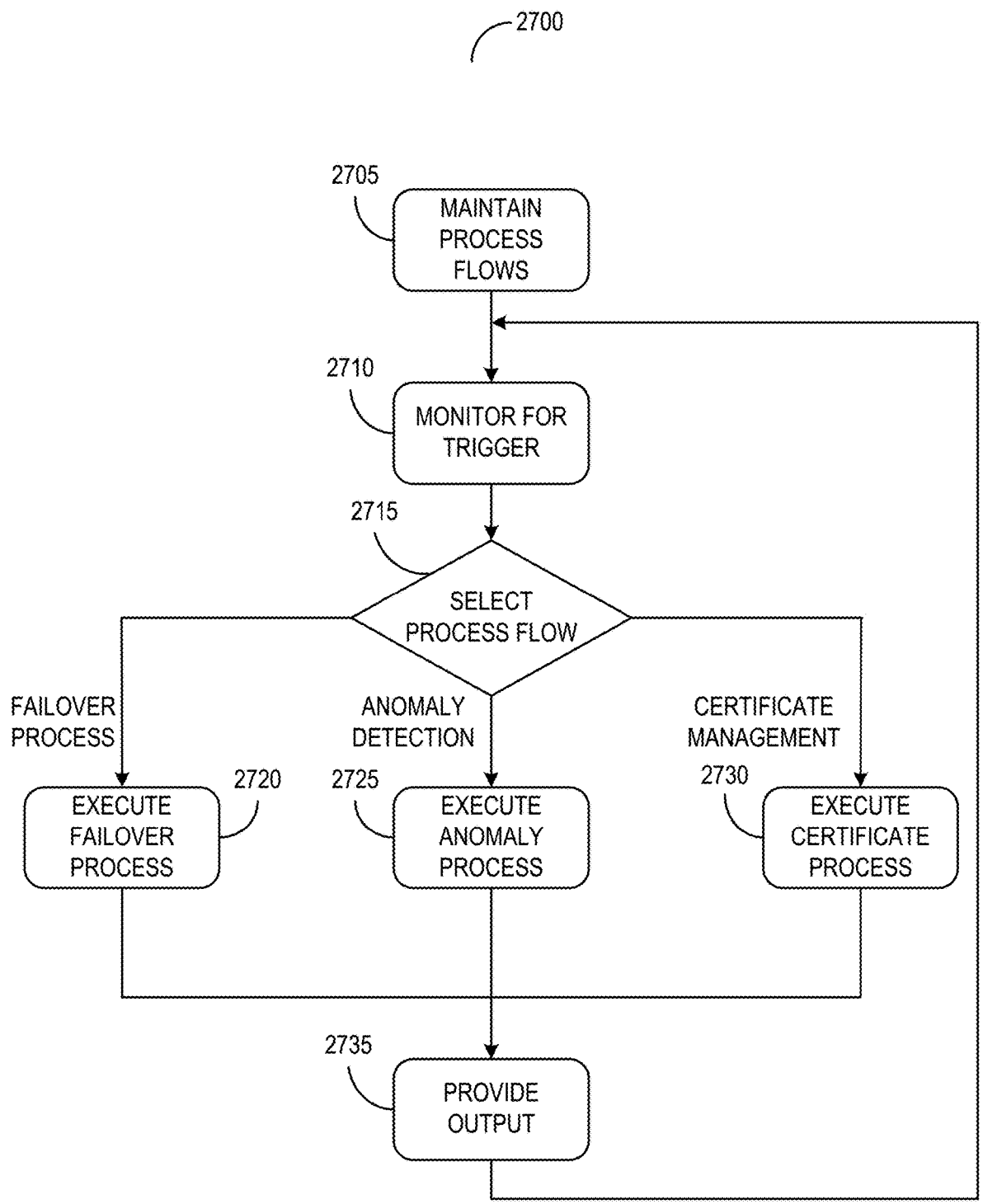
FIG. 27 depicts a flow diagram of a method of managing and executing process flows for administering networked environments in accordance with an illustrative embodiment.

FIG. 27 depicts a flow diagram of a method 2700 of managing and executing process flows for administering networked environments. The method 2700 may be performed by a service (e.g., an automated management service) executing machine-readable software code, though it should be appreciated that the various operations may be performed by one or more computing devices and/or processors. At step 2705, a service may maintain a set of process flows. Each process flow may include at least one trigger, a set of nodes, and a set of edges, among others. The trigger may define at least one condition under which the process flow is to be invoked to initiate at least one process of the process flow. The set of nodes may define, identify, or otherwise correspond to a set of processes to be performed in executing the process flow. Each edge may define, specify, or otherwise identify at least one relationship (e.g., a conditional logic) between at least two nodes in the set of nodes.

At step 2710, the service may monitor for a trigger in a networked environment. The service may check for the trigger for each of the process flows. The trigger may correspond to, for example, an occurrence of an event (e.g., an anomaly, failure, spike in network traffic, or update to services) in the network, a scheduled time (e.g., at a single time instance or an interval) to execute, a manual execution (e.g., one-touch activation) of the process flow, or a completion of execution of another process flow, among others.

At step 2715, the service may select a process flow corresponding to the trigger. When the trigger corresponds to the failover process, at step 2720, the service may carry out the failover process in accordance with the definitions of the process flow. When the trigger corresponds to the anomaly detection flow, at step 2725, the service may perform the anomaly detection process in accordance with the definitions of the process flow. When the trigger corresponds to the certificate management flow, at step 2730, the service may perform the certificate management process in accordance with the definitions of the process flow.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated.

The various aspects and embodiments disclosed are for purposes of illustration and are not intended to be limiting, with the true scope and spirit being indicated by the following claims.

What is claimed is:

1. A computer-implemented method of managing services, comprising:
   maintaining, by one or more processors, a plurality of process flows to manage a plurality of services in a network, each respective process flow of the plurality of process flows comprising:
      (i) a respective trigger defining a respective condition associated with performance of the network under which to invoke the respective process flow to initiate a respective first process of a respective plurality of processes on at least one of the plurality of services;
      (ii) a respective plurality of nodes corresponding to the respective plurality of processes, each node of the respective plurality of nodes including a respective definition identifying a respective process of the plurality of processes and at least one respective service of the plurality of services to execute the respective process; and
      (iii) at least one respective edge identifying a respective relationship between a respective first node and a respective second node of the respective plurality of nodes, the relationship identifying a respective second process of the respective plurality of processes corresponding to the second node, the second process to be executed by at least one second service of the plurality of services in response to completion of execution of the respective first process corresponding to the respective first node by at least one first service of the plurality of services;
   selecting, by the one or more processors, responsive to detecting a trigger defining a condition associated with performance of the network, a process flow from the plurality of process flows based on the trigger;
   executing, by the one or more processors, in accordance with a corresponding definition of a node of a plurality of nodes of the process flow, at least one process of the plurality of processes on at least one service of the plurality of services in the network; and
   generating, by the one or more processors, an output from executing the at least one process of the process flow.

2. The method of claim 1, further comprising providing, by the one or more processors, a user interface to define process flows, the user interface comprising a plurality of user interface elements, the plurality of user interface elements comprising:
   (i) a first user interface element to add, responsive to interaction with the first user interface element, one or more nodes corresponding to one or more processes to be executed on one or more of the plurality of services, and
   (ii) a second user interface elements to add, responsive to interaction with the second user interface element, one or more edges among the one or more nodes, the one or more edges corresponding to one or more relationships among the one or more processes corresponding to the one or more nodes.

3. The method of claim 2, further comprising:
   receiving, by the one or more processors, via one or more of the plurality of user interface elements of the user interface, a flow definition of the process flow identifying the plurality of nodes and at least one of the one or more edges; and
   generating, by the one or more processors, the process flow in accordance with the flow definition received via the user interface.

4. The method of claim 2, wherein providing the user interface further comprises providing the user interface comprising a region onto which (i) one or more first objects corresponding to the one or more nodes are added responsive to the interaction with the first user interface element and (ii) one or more second objects corresponding to the one or more edges are added responsive to the interaction with the second user interface element.

5. The method of claim 1, wherein the process flow comprises a failover process flow, and wherein executing the at least one process further comprises:
   executing the first process corresponding to a first node to identify a first plurality of servers available to host resources for a second plurality of servers to provide a service; and
   executing the second process corresponding to a second node identified by at least one edge as having a relationship with the first node, to transfer network traffic of the service from the second plurality of servers to the first plurality of servers.

6. The method of claim 1, wherein the process flow comprises an anomaly detection flow, and wherein the trigger comprises a detection of an anomaly in at least one service of the plurality of services in the network, wherein executing the at least one process further comprises:
   executing the first process corresponding to a first node to select, from a plurality of self-healing measures, a self-healing measure in response to the anomaly in the at least one service;
   executing the second process corresponding to a second node identified by at least one edge as having a relationship with the first node, the second process to carry out the self-healing measure; and
   executing a third process corresponding to a third node identified by a second edge as having a second relationship with the second node, the third process to validate resolution of the anomaly on the at least one service from carrying out the self-healing measure.

7. The method of claim 1, wherein the process flow comprises a certificate management flow, wherein the trigger identifies an expiration of a first certificate on a service on the plurality of services; and wherein executing the at least one process further comprises:
   executing the first process corresponding to a first node to renew the first certificate by generating a second certificate to provide to the service, in response to the expiration;
   executing the second process corresponding to a second node identified by at least one edge as having a relationship with the first node, the second process to provide the second certificate to the service; and
   executing a third process corresponding to a third node identified by a second edge as having a second relationship with the second node, to validate renewal.

8. The method of claim 1, further comprising identifying, by the one or more processors, from the process flow, a state corresponding to the at least one process, the state corresponding to the node including the definition of the at least one process; and wherein executing the at least one process further comprises executing the at least one process corresponding to the state of the process flow.

9. The method of claim 1, further comprising monitoring, by the one or more processors, for the trigger to invoke the process flow, the trigger comprising at least one of: a manual execution of the process flow, a detection of an event in the network, a scheduled time to execute the process flow, or a completion of execution of a second process flow.

10. The method of claim 1, wherein generating the output further comprises generating the output indicating a status of execution of the process flow in the plurality of services to address the performance in the network.

11. A system for managing services, comprising:
one or more processors coupled with memory, configured to:
maintain a plurality of process flows to manage a plurality of services in a network, each respective process flow of the plurality of process flows comprising:
(i) a respective trigger defining a respective condition associated with performance of the network under which to invoke the respective process flow to initiate a respective first process of a respective plurality of processes on at least one of the plurality of services;
(ii) a respective plurality of nodes corresponding to the respective plurality of processes, each node of the respective plurality of nodes including a respective definition identifying a respective process of the plurality of processes and at least one respective service of the plurality of services to execute the respective process; and
(iii) at least one respective edge identifying a respective relationship between a respective first node and a respective second node of the respective plurality of nodes, the relationship identifying a respective second process of the respective plurality of processes corresponding to the second node, the second process to be executed by at least one second service of the plurality of services in response to completion of execution of the respective first process corresponding to the respective first node by at least one first service of the plurality of services;
select, responsive to detecting a trigger defining a condition associated with performance of the network, a process flow from the plurality of process flows based on the trigger;
execute, in accordance with a corresponding definition of a node of the plurality of nodes of the process flow, at least one process of a plurality of processes on at least one service of the plurality of services in the network; and
generate an output from executing the at least one process of the process flow.

12. The system of claim 11, wherein the one or more processors are configured to provide a user interface to define process flows, the user interface comprising a plurality of user interface elements, the plurality of user interface elements comprising:
(i) a first user interface element to add, responsive to interaction with the first user interface element, one or more nodes corresponding to one or more processes to be executed on one or more of the plurality of services, and (ii) a second user interface elements to add, responsive to interaction with the second user interface element, one or more edges among the one or more nodes, the one or more edges corresponding to one or more relationships among the one or more processes corresponding to the one or more nodes.

13. The system of claim 12, wherein the one or more processors are configured to:
receive, via one or more of the plurality of user interface elements of the user interface, a flow definition of the process flow identifying the plurality of nodes and at least one of the one or more edges; and
generate the process flow in accordance with the flow definition received via the user interface.

14. The system of claim 12, wherein the one or more processors are configured to provide the user interface comprising a region onto which (i) one or more first objects corresponding to the one or more nodes are added responsive to the interaction with the first user interface element and (ii) one or more second objects corresponding to the one or more edges are added responsive to the interaction with the second user interface element.

15. The system of claim 11, wherein the process flow comprises a failover process flow, and the one or more processors are configured to:
execute the first process corresponding to a first node to identify a first plurality of servers available to host resources for a second plurality of servers to provide a service; and
execute the second process corresponding to a second node identified by at least one edge as having a relationship with the first node, to transfer network traffic of the service from the second plurality of servers to the first plurality of servers.

16. The system of claim 11, wherein the process flow comprises an anomaly detection flow, and wherein the trigger comprises a detection of an anomaly in at least one service of the plurality of services in the network, wherein one or more processes are further configured to:
execute the first process corresponding to a first node to select, from a plurality of self-healing measures, a self-healing measure in response to the anomaly in the at least one service;
execute the second process corresponding to a second node identified by at least one edge as having a relationship with the first node, the second process to carry out the self-healing measure; and
execute a third process corresponding to a third node identified by a second edge as having a second relationship with the second node, the third process to validate resolution of the anomaly on the at least one service from carrying out the self-healing measure.

17. The system of claim 11, wherein the process flow comprises a certificate management flow, wherein the trigger identifies an expiration of a first certificate on a service on the plurality of services; and wherein the one or more processors are further configured to:
execute the first process corresponding to a first node to renew the first certificate by generating a second certificate to provide to the service, in response to the expiration;
execute the second process corresponding to a second node identified by at least one edge as having a relationship with the first node, the second process to provide the second certificate to the service; and execute a third process corresponding to a third node identified by a second edge as having a second relationship with the second node, to validate renewal.

18. The system of claim 11, wherein the one or more processors are configured to:

identify from the process flow, a state corresponding to the at least one process, the state corresponding to the node including the definition of the at least one process; and execute the at least one process corresponding to the state of the process flow.

19. The system of claim 11, wherein the one or more processors are configured to monitor, for the trigger to invoke the process flow, the trigger comprising at least one of: a manual execution of the process flow, a detection of an event in the network, a scheduled time to execute the process flow, or a completion of execution of a second process flow.

20. The system of claim 11, wherein the one or more processors are configured to generate the output indicating a status of execution of the process flow in the plurality of services to address the performance in the network.

\* \* \* \* \*